United States Patent
Mikajiri et al.

(10) Patent No.: US 12,556,843 B2
(45) Date of Patent: Feb. 17, 2026

(54) PHOTOELECTRIC CONVERSION DEVICE AND PHOTODETECTION SYSTEM

(71) Applicant: CANON KABUSHIKI KAISHA, Tokyo (JP)

(72) Inventors: Satoru Mikajiri, Gunma (JP); Atsushi Furubayashi, Kanagawa (JP); Mayu Ishikawa, Kanagawa (JP); Hiroshi Yoshioka, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 543 days.

(21) Appl. No.: 18/145,577

(22) Filed: Dec. 22, 2022

(65) Prior Publication Data

US 2023/0217137 A1     Jul. 6, 2023

(30) Foreign Application Priority Data

Jan. 1, 2022 (JP) ................................ 2022-000028
Jan. 1, 2022 (JP) ................................ 2022-000029

(51) Int. Cl.
*H04N 25/773* (2023.01)
*H10F 30/225* (2025.01)
*H10F 39/18* (2025.01)
*H10F 77/00* (2025.01)

(52) U.S. Cl.
CPC ......... *H04N 25/773* (2023.01); *H10F 30/225* (2025.01); *H10F 39/184* (2025.01); *H10F 77/959* (2025.01)

(58) Field of Classification Search
CPC ...... H04N 25/773; H04N 25/77; H04N 25/79; H10F 30/225; H10F 39/184; H10F 39/18; H10F 77/959
See application file for complete search history.

(56) References Cited

U.S. PATENT DOCUMENTS

| | | |
|---|---|---|
| 11,164,899 B2 | 11/2021 | Yamasaki |
| 2020/0244909 A1 | 7/2020 | Morimoto |
| 2021/0166274 A1* | 6/2021 | Maliszewski ...... G06Q 30/0244 |
| 2022/0006965 A1 | 1/2022 | Zhu |

(Continued)

FOREIGN PATENT DOCUMENTS

| | | |
|---|---|---|
| JP | 2020-28081 A | 2/2020 |
| JP | 2020-96347 A | 6/2020 |
| JP | 2020-123847 A | 8/2020 |

OTHER PUBLICATIONS

U.S. Appl. No. 17/960,247, filed Oct. 5, 2022 by Hideo Kobayashi.
(Continued)

*Primary Examiner* — Sitaramarao S Yechuri
(74) *Attorney, Agent, or Firm* — VENABLE LLP

(57) ABSTRACT

A photoelectric conversion device includes a pixel, the pixel including an avalanche photodiode, and a signal processing circuit including a counter configured to generate a count value based on a photon incident on the avalanche photodiode during a count period, the signal processing circuit being configured to output the count value for each count period repeatedly. The pixel transitions from a first state to a second state in which a length of the count period is shorter than that in the first state in accordance with a result of determination based on the count value and a predetermined threshold value.

42 Claims, 35 Drawing Sheets

(56) References Cited

U.S. PATENT DOCUMENTS

2023/0123494 A1\* 4/2023 Price ................... H04N 23/741
  348/207.99
2023/0324522 A1\* 10/2023 Henderson ............ G01S 7/4865
  356/5.01

OTHER PUBLICATIONS

Japanese Office Action issued Oct. 30, 2025 during prosecution of related Japanese Application No. 2022-000028 (English machine translation included).

\* cited by examiner

PHOTOELECTRIC CONVERSION DEVICE AND PHOTODETECTION SYSTEM

BACKGROUND OF THE INVENTION

Field of the Invention

The present disclosure relates to a photoelectric conversion device and a photodetection system.

Description of the Related Art

Japanese Patent Application Laid-Open No. 2020-123847 discloses a photoelectric conversion device having avalanche photodiodes arranged in a matrix. The avalanche photodiode amplifies signal charges excited by a photon several times to several million times by using an avalanche multiplication phenomenon generated by a strong electric field induced in a p-n junction portion of a semiconductor.

Japanese Patent Application Laid-Open No. 2020-096347 discloses an asynchronous solid-state imaging device that operates in response to detection of an event such as a change in light intensity. The solid-state imaging device disclosed in Japanese Patent Application Laid-Open No. 2020-096347 includes a detection pixel for detecting an event and a counting pixel for counting the number of photons incident on an avalanche photodiode when an event occurs and outputting a pixel signal.

In an asynchronous photoelectric conversion device as described in Japanese Patent Application Laid-Open No. 2020-096347, reduction of power consumption is required.

SUMMARY OF THE INVENTION

It is an object of the present disclosure to provide a photoelectric conversion device and a photodetection system with reduced power consumption.

According to a disclosure of the present specification, there is provided a photoelectric conversion device including a pixel, the pixel including an avalanche photodiode, and a signal processing circuit including a counter configured to generate a count value based on a photon incident on the avalanche photodiode during a count period, the signal processing circuit being configured to output the count value for each count period repeatedly. The pixel transitions from a first state to a second state in which a length of the count period is shorter than that in the first state in accordance with a result of determination based on the count value and a predetermined threshold value.

According to another disclosure of the present specification, there is provided a photoelectric conversion device including a pixel, the pixel including an avalanche photodiode, and a signal processing circuit including a counter configured to generate a count value based on a photon incident on the avalanche photodiode during a count period, the signal processing circuit being configured to output the count value for each count period repeatedly. The pixel transitions from a first state to a second state in which an interval between two count periods is shorter than that in the first state in accordance with a result of determination based on the count value and a predetermined threshold value.

According to another disclosure of the present specification, there is provided a photoelectric conversion device including a pixel, the pixel including an avalanche photodiode, a signal processing circuit including a counter configured to generate a count value based on a photon incident on the avalanche photodiode during a count period, the signal processing circuit being configured to output the count value at a predetermined frame rate, a quenching transistor configured to return a state of the avalanche photodiode after an avalanche multiplication has occurred to a state in which the avalanche multiplication is enabled again, and a pulse generation unit configured to output a pulse signal whose level changes at a predetermined frequency to a gate of the quenching transistor. The pixel transitions from a first state to a second state in which the frequency and the frame rate are higher than those in the first state in accordance with a result of determination based on the count value and a predetermined threshold value.

According to another disclosure of the present specification, there is provided a photoelectric conversion device including a pixel, the pixel including an avalanche photodiode, a signal processing circuit including a counter configured to generate a count value based on a photon incident on the avalanche photodiode during a count period, the signal processing circuit being configured to output the count value at a predetermined frame rate, a quenching transistor configured to return a state of the avalanche photodiode after an avalanche multiplication has occurred to a state in which the avalanche multiplication is enabled again, and a pulse generation unit configured to output a pulse signal whose level changes at a predetermined frequency to a gate of the quenching transistor. The pixel transitions from a first state to a second state in which the frequency is higher than that in the first state and the number of bits of the count value is greater than that in the first state in accordance with a result of determination based on the count value and a predetermined threshold value.

Further features of the present invention will become apparent from the following description of exemplary embodiments with reference to the attached drawings.

DESCRIPTION OF THE EMBODIMENTS

Figure 1:
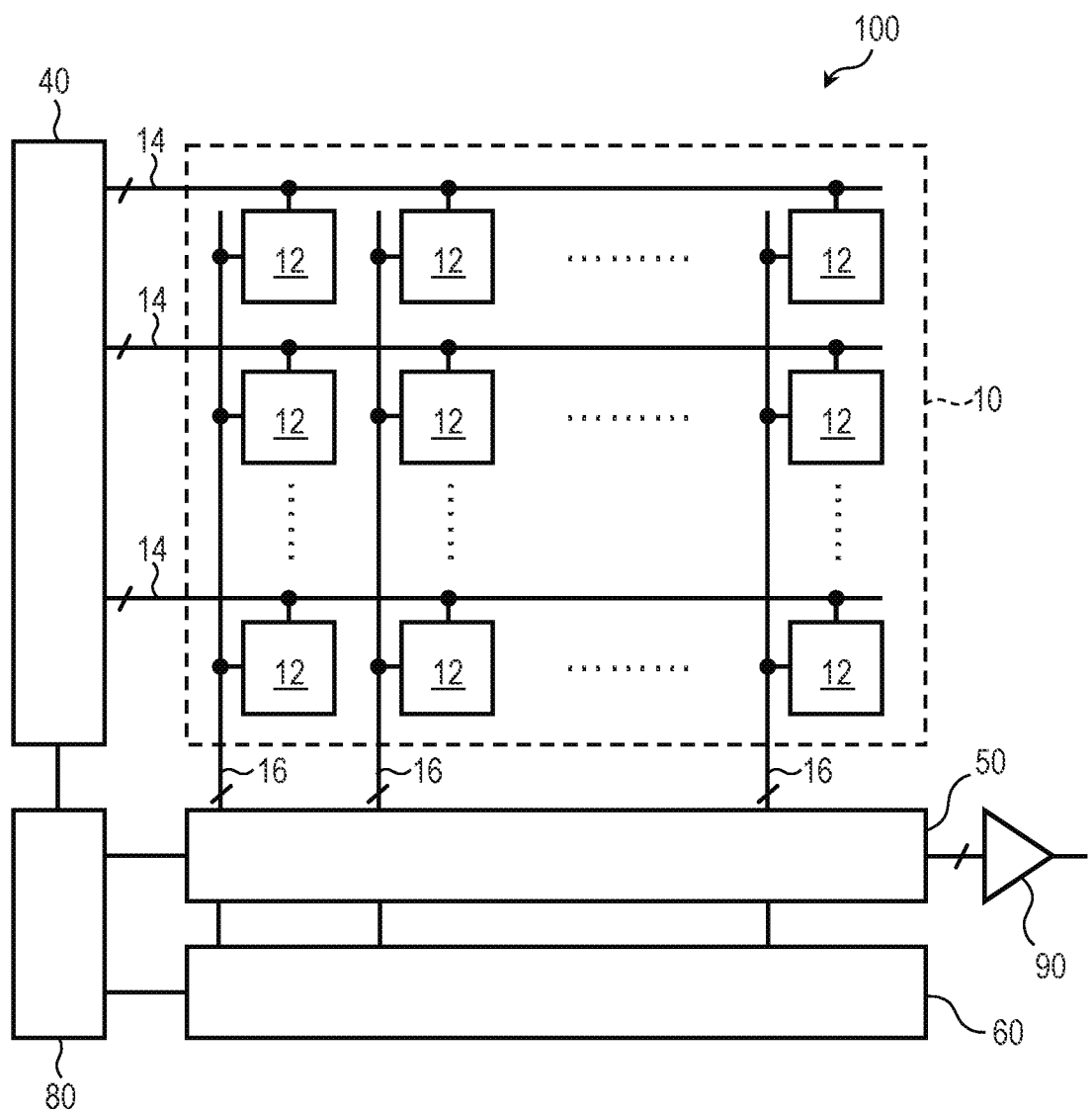
FIG. 1 is a block diagram illustrating a schematic configuration of a photoelectric conversion device according to a first embodiment of the present disclosure (part 1).

Preferred embodiments of the present invention will now be described in detail in accordance with the accompanying drawings. In the drawings, the same or corresponding elements are denoted by the same reference numerals, and the description thereof may be omitted or simplified. The following embodiments are intended to embody the technical idea of the present invention and do not limit the present invention. The sizes and positional relationships of the members illustrated in the drawings may be exaggerated for clarity of explanation.

First Embodiment

Figure 2:
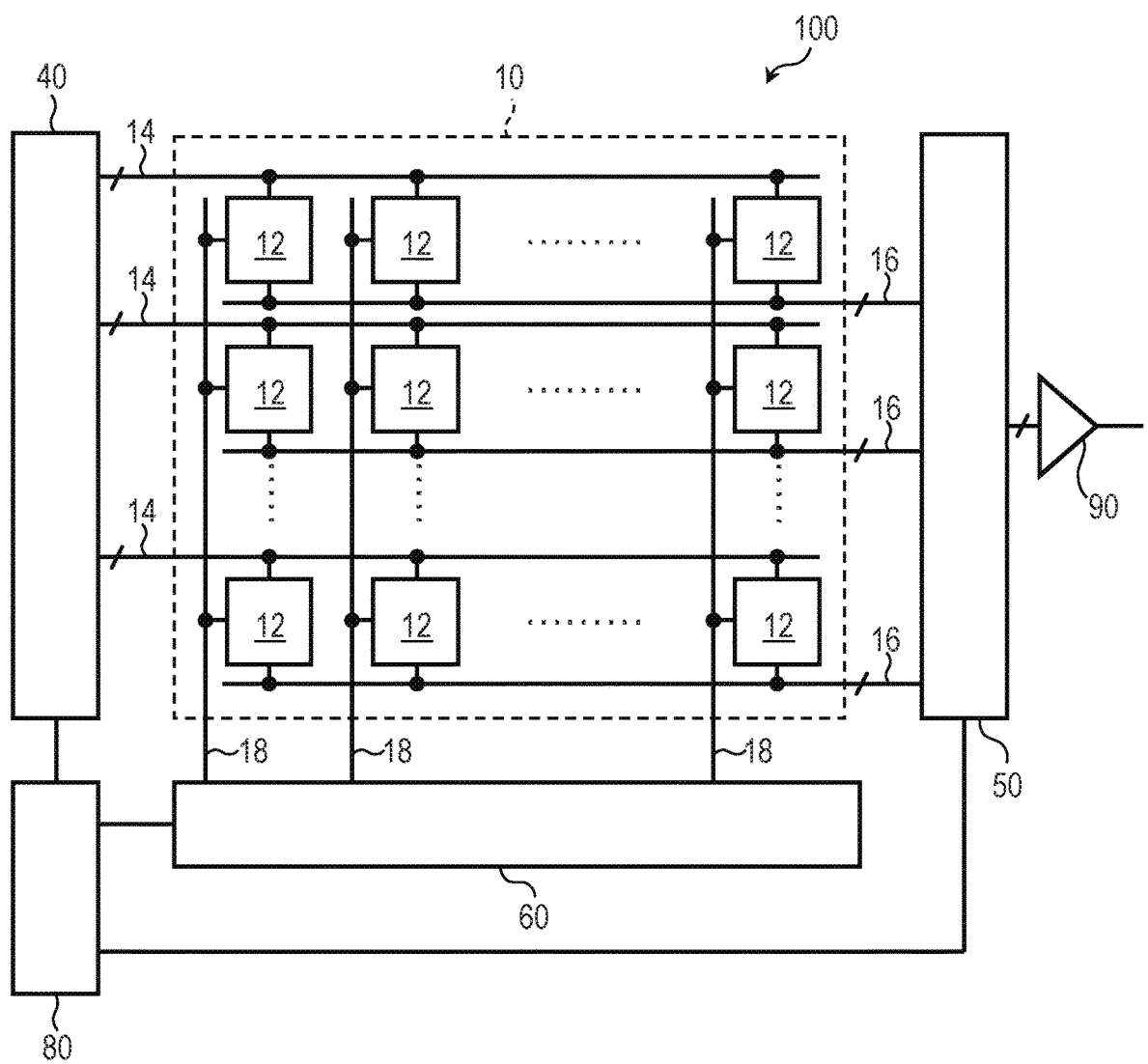
FIG. 2 is a block diagram illustrating a schematic configuration of the photoelectric conversion device according to the first embodiment of the present disclosure (part 2).
Figure 3:
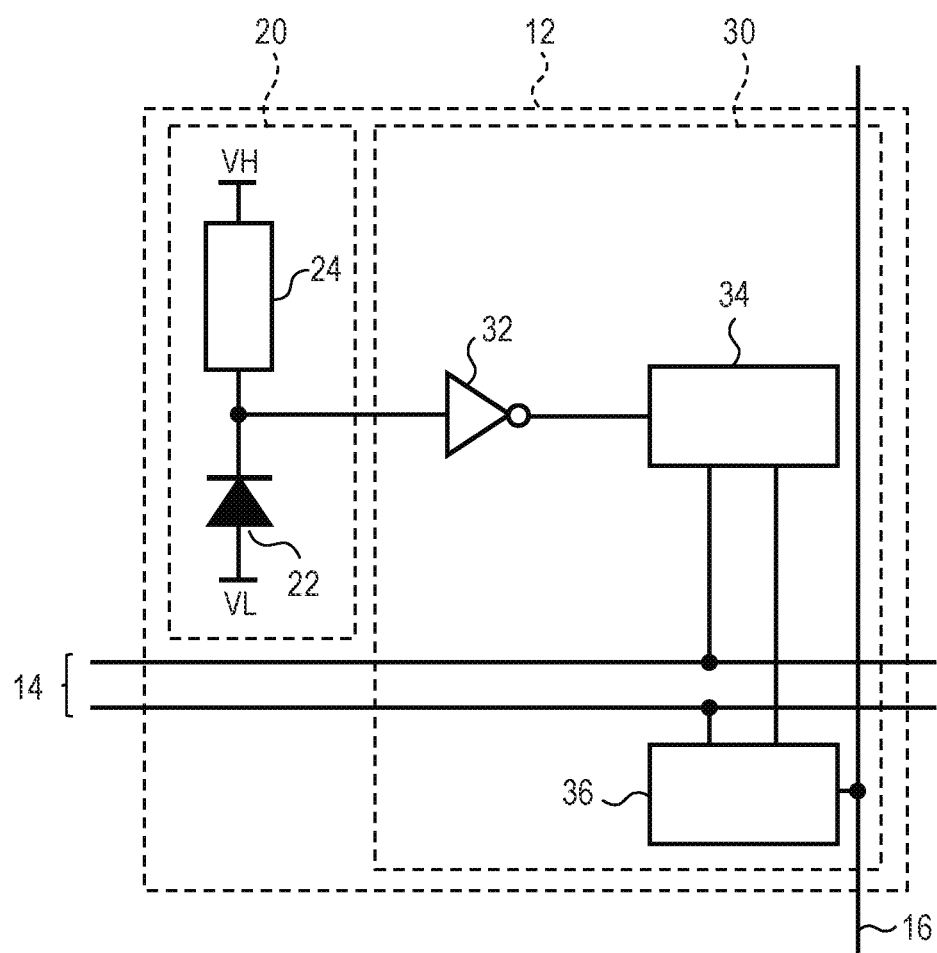
FIG. 3 is a block diagram illustrating a configuration example of a pixel in the photoelectric conversion device according to the first embodiment of the present disclosure.
Figure 4:
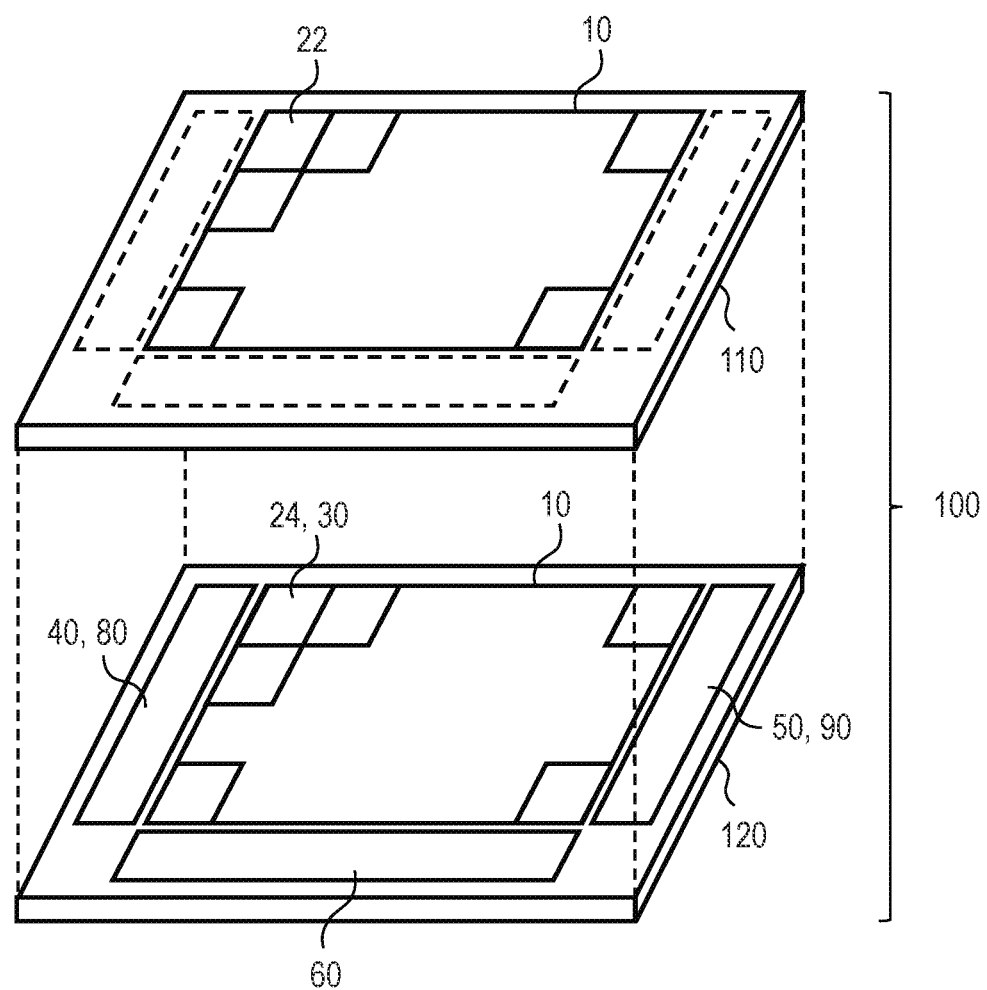
FIG. 4 is a perspective view illustrating a configuration example of the photoelectric conversion device according to the first embodiment of the present disclosure.
Figure 5A:
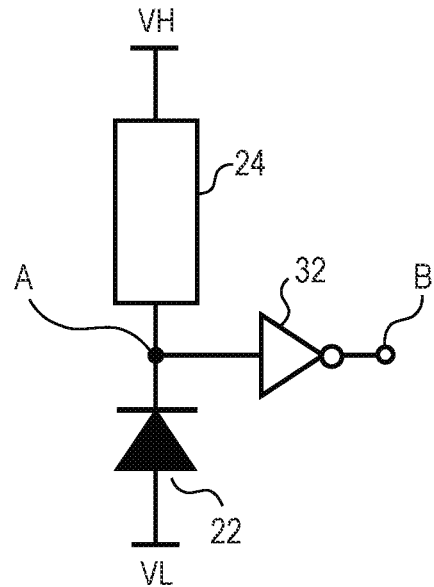
FIGS. 5A, 5B, and 5C are diagrams illustrating a basic operation of a photoelectric conversion unit in the photoelectric conversion device according to the first embodiment of the present disclosure.
Figure 5B:
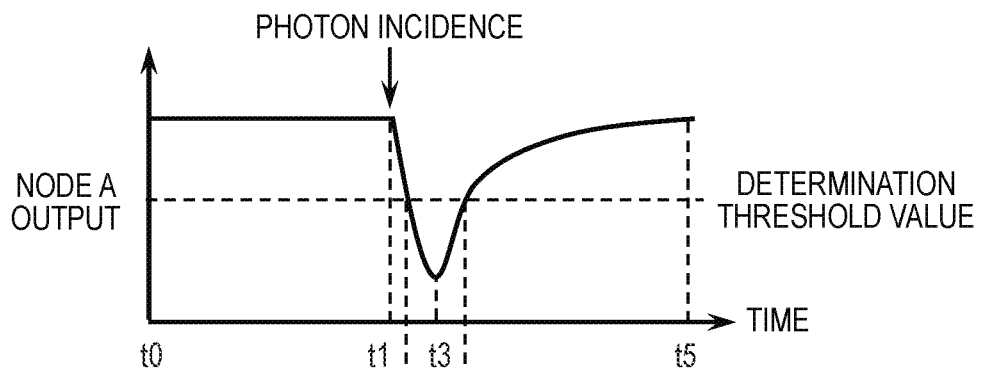
Figure 5C:
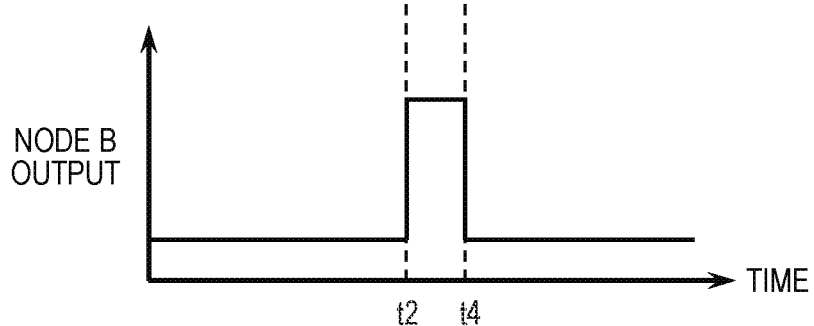
Figure 6:
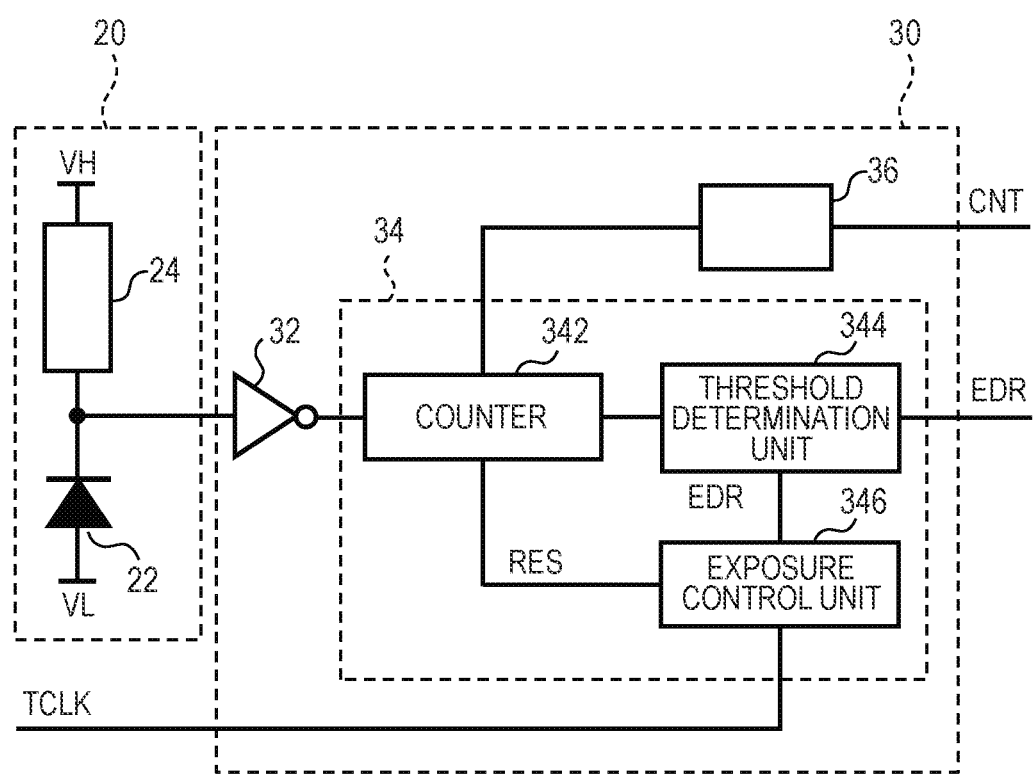
FIG. 6 is a block diagram illustrating a more specific configuration example of the pixel in the photoelectric conversion device according to the first embodiment of the present disclosure.
Figure 7:
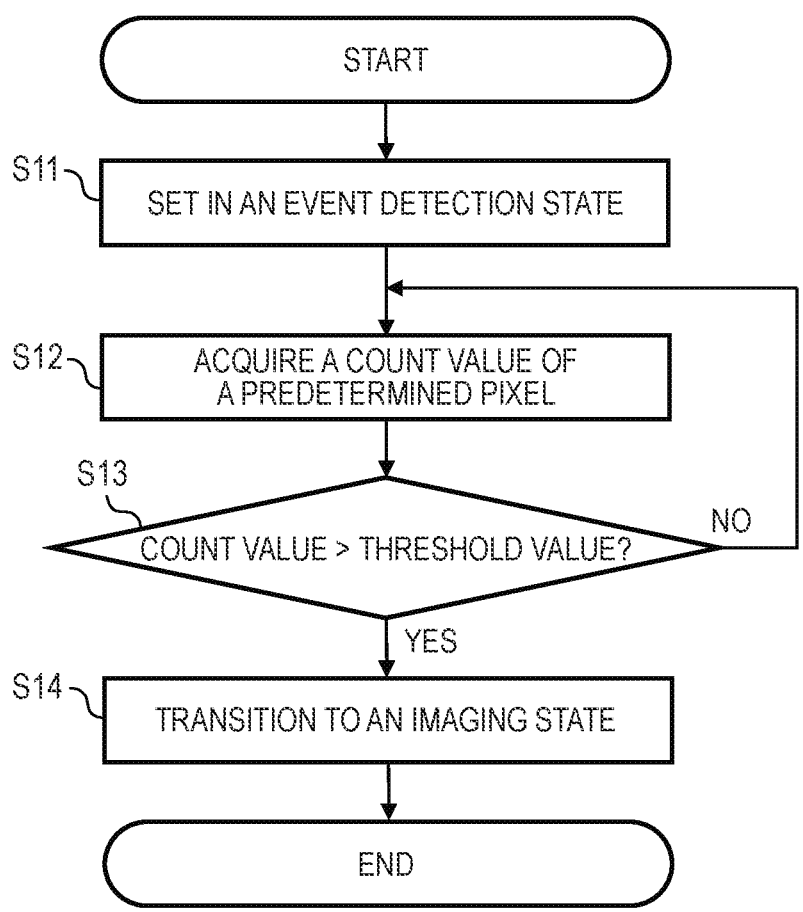
FIG. 7 is a flowchart illustrating an example of a driving method in the photoelectric conversion device according to the first embodiment of the present disclosure.
Figure 8:
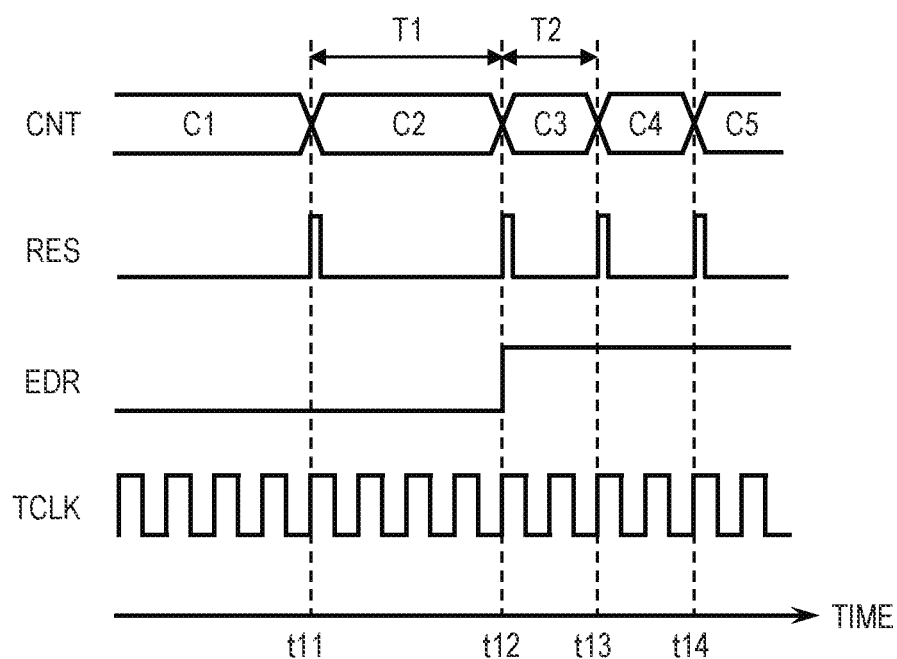
FIG. 8 is a timing chart illustrating an example of a pixel driving method in the photoelectric conversion device according to the first embodiment of the present disclosure.

A photoelectric conversion device according to a first embodiment of the present disclosure will be described with reference to FIGS. 1 to 8. FIGS. 1 and 2 are block diagrams illustrating a schematic configuration of the photoelectric conversion device according to the present embodiment. FIG. 3 is a block diagram illustrating a configuration example of a pixel of the photoelectric conversion device according to the present embodiment. FIG. 4 is a perspective view illustrating a configuration example of the photoelectric conversion device according to the present embodiment. FIGS. 5A, 5B, and 5C are diagrams illustrating a basic operation of a photoelectric conversion unit of the photoelectric conversion device according to the present embodiment. FIG. 6 is a block diagram illustrating a more specific configuration example of the pixel in the photoelectric conversion device according to the present embodiment. FIG. 7 is a flowchart illustrating an example of a driving method in the photoelectric conversion device according to the present embodiment. FIG. 8 is a timing chart illustrating an example of a pixel driving method in the photoelectric conversion device according to the present embodiment.

As illustrated in FIG. 1, the photoelectric conversion device 100 according to the present embodiment includes a pixel unit 10, a vertical scanning circuit unit 40, a reading circuit unit 50, a horizontal scanning circuit unit 60, a control pulse generation unit 80, and an output circuit unit 90. In the following description, the photoelectric conversion device is an asynchronous imaging device using an avalanche photodiode, but the photoelectric conversion device is not limited thereto. Examples of the photoelectric conversion device include a ranging device (a device such as a focus detection device or a distance measurement device using time of flight (TOF)) and a photometric device (a device such as a measurement device for measuring the amount of incident light) in addition to the imaging device described below.

The pixel unit 10 is provided with a plurality of pixels 12 arranged in an array so as to form a plurality of rows and a plurality of columns. Each pixel 12 may include a photoelectric conversion unit including a photon detecting element and a pixel signal processing unit that processes a signal output from the photoelectric conversion unit, as described later. The number of pixels 12 constituting the pixel unit 10 is not particularly limited. For example, the pixel unit 10 can be constituted by a plurality of pixels 12 arranged in an array of several thousands of rows and several thousands of columns as in a general digital camera. Alternatively, the pixel unit 10 may include a plurality of pixels 12 arranged in one row or one column. Alternatively, the pixel may be constituted by one pixel 12.

In each row of the pixel array of the pixel unit 10, a control line 14 is arranged extending in the first direction (the lateral direction in FIG. 1). The control line 14 is connected to the pixels 12 arranged in the first direction, and serve as a signal line common to the pixels 12. The first direction in which the control lines 14 extend may be denoted as a row direction or a horizontal direction. Each of the control lines 14 may include a plurality of signal lines for supplying a plurality of types of control signals to the pixels 12.

In addition, in each column of the pixel array of the pixel unit 10, a data line 16 is arranged so as to extend in a second direction (vertical direction in FIG. 1) intersecting with the first direction. The data line 16 is connected to the pixels 12 arranged in the second direction, and serve as a signal line common to the pixels 12. The second direction in which the data lines 16 extend may be referred to as a column direction or a vertical direction. Each of the data lines 16 may include a plurality of signal lines for transferring respective bits of a multi-bit digital signal output from the pixel 12.

The control lines 14 in respective rows are connected to the vertical scanning circuit unit 40. The vertical scanning circuit unit 40 is a control unit having a function of receiving a control signal output from the control pulse generation unit 80, generating control signals for driving the pixels 12, and supplying the control signals to the pixels 12 through the control lines 14. A logic circuit such as a shift register or an address decoder may be used for the vertical scanning circuit unit 40. The vertical scanning circuit unit 40 sequentially scans the pixels 12 in the pixel unit 10 on a row basis, and outputs pixel signals of the pixels 12 to the reading circuit unit 50 via the data lines 16.

The data lines 16 in respective columns are connected to the reading circuit unit 50. The reading circuit unit 50 includes a plurality of holding units (not illustrated) provided corresponding to each column of the pixel array of the pixel unit 10, and has a function of holding the pixel signals of the pixels 12 of each column outputted from the pixel unit 10 on a row basis via the data line 16 in the holding units of the corresponding columns.

The horizontal scanning circuit unit 60 is a control unit that receives a control signal output from the control pulse generation unit 80, generates a control signal for reading out a pixel signal from a holding unit of each column of the reading circuit unit 50, and supplies the control signal to the reading circuit unit 50. A logic circuit such as a shift register or an address decoder may be used for the horizontal scanning circuit unit 60. The horizontal scanning circuit unit 60 sequentially scans the holding units of the respective columns of the reading circuit unit 50, and sequentially outputs the pixel signals held in the respective holding units to the output circuit unit 90.

The output circuit unit 90 includes an external interface circuit, and outputs the pixel signal output from the reading circuit unit 50 to the outside of the photoelectric conversion device 100. The external interface circuit included in the output circuit unit 90 is not particularly limited. The external interface circuit may be composed of, for example, a SERializer/DESerializer (SerDes) transmission circuit. The SerDes transmission circuit is, for example, a low voltage differential signaling (LVDS) circuit or a scalable low voltage signaling (SLVS) circuit.

The control pulse generation unit 80 is a control circuit for generating control signals for controlling the operations and timings thereof in the vertical scanning circuit unit 40, the reading circuit unit 50, and the horizontal scanning circuit unit 60, and supplying the control signals to respective functional blocks. At least a part of the control signals for controlling the operations and timings thereof in the vertical scanning circuit unit 40, the reading circuit unit 50, and the horizontal scanning circuit unit 60 may be supplied from the outside of the photoelectric conversion device 100.

The connection configuration of functional blocks of the photoelectric conversion device 100 is not limited to the configuration example illustrated in FIG. 1, and may be configured as illustrated in FIG. 2, for example.

In the configuration example of FIG. 2, data lines 16 extending in the first direction are arranged in respective rows of the pixel array of the pixel unit 10. The data lines 16 are connected to the pixels 12 arranged in the first direction, and serve as signal lines common to the pixels 12. In addition, control lines 18 extending in the second direction are arranged in respective columns of the pixel array of the pixel unit 10. The control lines 18 are connected to the pixels 12 arranged in the second direction, and serve as signal lines common to the pixels 12.

The control lines 18 in respective columns are connected to the horizontal scanning circuit unit 60. The horizontal scanning circuit unit 60 receives a control signal output from the control pulse generation unit 80, generates a control signal for reading out a pixel signal from the pixel 12, and supplies the control signal to the pixel 12 via the control lines 18. Specifically, the horizontal scanning circuit unit 60 sequentially scans the plurality of pixels 12 of the pixel unit 10 on a column basis, and outputs pixel signals of the pixels 12 in respective rows belonging to a selected column to the data lines 16.

The data lines 16 of respective rows are connected to the reading circuit unit 50. The reading circuit unit 50 includes a plurality of holding units (not illustrated) provided corresponding to each row of the pixel array of the pixel unit 10, and has a function of holding the pixel signals of the pixels 12 of each row outputted from the pixel unit 10 on a column basis via the data line 16 in the holding units of the corresponding rows.

The reading circuit unit 50 receives the control signal output from the control pulse generation unit 80, and sequentially outputs the pixel signals held in the holding units of the respective rows to the output circuit unit 90.

Other configurations in the configuration example of FIG. 2 may be similar to those in the configuration example of FIG. 1.

As illustrated in FIG. 3, each pixel 12 includes a photoelectric conversion unit 20 and a pixel signal processing unit 30 (signal processing circuit). The photoelectric conversion unit 20 includes a photon detecting element 22 and a quenching element 24. The pixel signal processing unit 30 includes a waveform shaping unit 32, a digital processing circuit 34, and a pixel output circuit 36.

The photon detecting element 22 may be an avalanche photodiode (hereinafter referred to as "APD"). The anode of the APD constituting the photon detecting element 22 is connected to a node to which a voltage VL is supplied. The cathode of the APD constituting the photon detecting element 22 is connected to one terminal of the quenching element 24. A connection node between the photon detecting element 22 and the quenching element 24 is an output node of the photoelectric conversion unit 20. The other terminal of the quenching element 24 is connected to a node to which a voltage VH higher than the voltage VL is supplied. The voltage VL and the voltage VH are set such that a reverse bias voltage sufficient for the APD to perform the avalanche multiplication operation is applied. In one example, a negative high voltage is applied as the voltage VL, and a positive voltage about a power supply voltage is applied as the voltage VH. For example, the voltage VL is −30 V and the voltage VH is 1 V.

The photon detecting element 22 may be composed of APD as described above. By supplying a reverse bias voltage sufficient to perform the avalanche multiplication operation to the APD, charges generated by light incidence to the APD cause avalanche multiplication, and an avalanche multiplication current is generated. The operation modes in a state where a reverse bias voltage is supplied to the APD include a Geiger mode and a linear mode. The Geiger mode is an operation mode in which a voltage applied between the anode and the cathode is set to a reverse bias voltage greater than a breakdown voltage of the APD. The linear mode is an operation mode in which a voltage applied between the anode and the cathode is set to a reverse bias voltage close to or lower than the breakdown voltage of the APD. The APD operating in the Geiger mode is called a single photon avalanche diode (SPAD). The APD constituting the photon detecting element 22 may operate in the linear mode or the Geiger mode. In particular the SPAD is preferable because the potential difference of the SPAD becomes greater than that of APD of linear mode, and the effect of withstand voltage becomes significant.

The quenching element 24 has a function of converting a change in the avalanche multiplication current generated in the photon detecting element 22 into a voltage signal. Further, the quenching element 24 functions as a load circuit (quenching circuit) when a signal is multiplied by avalanche multiplication, and has a function of reducing a voltage applied to the photon detecting element 22 to suppress avalanche multiplication. The operation in which the quenching element 24 suppresses avalanche multiplication is referred to as a quenching operation. Further, the quenching element 24 has a function of returning the voltage supplied to the photon detecting element 22 to the voltage VH by passing a current corresponding to the voltage drop by the quenching operation. The operation in which the quenching element 24 returns the voltage supplied to the photon detecting element 22 to the voltage VH is referred to as a recharging operation. The quenching element 24 may be composed of a resistive element, a MOS transistor, or the like.

The waveform shaping unit 32 has an input node to which an output signal of the photoelectric conversion unit 20 is supplied and an output node. The waveform shaping unit 32 has a function of converting an analog signal supplied from the photoelectric conversion unit 20 into a pulse signal. As illustrated in FIG. 3, the waveform shaping unit 32 may be configured by an inverter circuit or the like. The output node of the waveform shaping unit 32 is connected to the digital processing circuit 34.

The digital processing circuit 34 has an input node to which an output signal of the waveform shaping unit 32 is supplied, an input node connected to the control line 14, and an output node. The digital processing circuit 34 includes a counter described later. The counter has a function of counting pulses superimposed on a signal output from the waveform shaping unit 32, and holding a count value as a result of the counting. A signal supplied from the vertical scanning circuit unit 40 to the digital processing circuit 34 via the control line 14 may include a timer clock signal for controlling a pulse count period (exposure period). An output node of the digital processing circuit 34 is connected to the data line 16 via the pixel output circuit 36.

The pixel output circuit 36 has a function of switching an electrical connection state (connection or disconnection) between the digital processing circuit 34 and the data line 16. The pixel output circuit 36 switches the connection state between the digital processing circuit 34 and the data line 16 in accordance with a control signal supplied from the vertical scanning circuit unit 40 via the control line 14 (In the configuration example of FIG. 2, the control signal is supplied from the horizontal scanning circuit unit 60 via the control line 18). The pixel output circuit 36 may include a buffer circuit for outputting a signal.

The pixel 12 is typically a unit structure that outputs a pixel signal for forming an image. However, in the case where distance measurement or the like using a time of flight (TOF) method is intended, the pixel 12 need not necessarily be a unit structure that outputs a pixel signal for forming an image. That is, the pixel 12 may be a unit structure that outputs a signal for measuring the time at which light has reached and the amount of light.

One pixel signal processing unit 30 is not necessarily provided for each pixel 12, and one pixel signal processing unit 30 may be provided for a plurality of pixels 12. In this case, one pixel signal processing unit 30 can be used to sequentially perform signal processing of the plurality of pixels 12.

The photoelectric conversion device 100 according to the present embodiment may be formed on one substrate, or may be configured as a stacked photoelectric conversion device in which a plurality of substrates is stacked. In the latter case, for example, as illustrated in FIG. 4, the sensor substrate 110 and the circuit substrate 120 may be stacked and electrically connected to each other to form a stacked photoelectric conversion device. In the sensor substrate 110, at least the photon detecting element 22 among the components of the pixel 12 may be arranged. Further, the quenching element 24 and the pixel signal processing unit 30 among the components of the pixel 12 may be arranged in the circuit substrate 120. The photon detecting element 22, the quenching element 24, and the pixel signal processing unit 30 are electrically connected to each other through a connection wiring provided for each pixel 12. The circuit substrate 120 may further has the vertical scanning circuit unit 40, the reading circuit unit 50, the horizontal scanning circuit unit 60, the control pulse generation unit 80, and the output circuit unit 90.

In each pixel 12, the photon detecting element 22 provided on the sensor substrate 110 and the quenching element 24 and the pixel signal processing unit 30 provided on the circuit substrate 120 are arranged so as to overlap each other in a plan view. The vertical scanning circuit unit 40, the reading circuit unit 50, the horizontal scanning circuit unit 60, the control pulse generation unit 80, and the output circuit unit 90 may be arranged around the pixel unit 10 that includes a plurality of pixels 12.

In this specification, the term "plan view" refers to a view from a direction perpendicular to the light incident surface of the sensor substrate 110.

By configuring the stacked photoelectric conversion device 100, the degree of integration of elements can be increased and high functionality can be achieved. In particular, since a substrate in which the photon detecting element 22 is arranged is different from a substrate in which the quenching element 24 and the pixel signal processing unit 30 are arranged, the photon detecting element 22 can be arranged at a high density without sacrificing the light receiving area of the photon detecting element 22, and the photon detecting efficiency can be improved.

The number of substrates constituting the photoelectric conversion device 100 is not limited to two, and three or more substrates may be stacked to form the photoelectric conversion device 100.

Although FIG. 4 assumes diced chips as the sensor substrate 110 and the circuit substrate 120, the sensor substrate 110 and the circuit substrate 120 are not limited to the chips. For example, each of the sensor substrate 110 and the circuit substrate 120 may be a wafer. In addition, the sensor substrate 110 and the circuit substrate 120 may be stacked in a wafer state and then diced, or may be stacked and bonded after the sensor substrate 110 and the circuit substrate 120 are formed into chips.

FIGS. 5A, 5B, and 5C are diagrams illustrating a basic operation of the photoelectric conversion unit 20 and the waveform shaping unit 32. FIG. 5A is a circuit diagram of the photoelectric conversion unit 20 and the waveform shaping unit 32, FIG. 5B illustrates a waveform of a signal at an input node (node A) of the waveform shaping unit 32, and FIG. 5C illustrates a waveform of a signal at an output node (node B) of the waveform shaping unit 32. Here, for simplicity of explanation, it is assumed that the waveform shaping unit 32 is configured by an inverter circuit.

At time t0, a reverse bias voltage of a potential difference corresponding to (VH-VL) is applied to the photon detecting element 22. Although a reverse bias voltage sufficient to cause avalanche multiplication is applied between the anode and the cathode of the APD constituting the photon detecting element 22, carriers that can be the seeds of avalanche multiplication do not exist in a state where no photon is incident on the photon detecting element 22. Therefore, no avalanche multiplication occurs in the photon detecting element 22, and no current flows through the photon detecting element 22.

At time t1, it is assumed that a photon is incident on the photon detecting element 22. When a photon is incident on the photon detecting element 22, an electron-hole pair is generated by photoelectric conversion, and avalanche occurs using these carriers as a seed, and an avalanche multiplication current flows through the photon detecting element 22. When the avalanche multiplication current flows through the quenching element 24, a voltage drop by the quenching element 24 occurs, and the voltage of the node A begins to drop. When the voltage drop amount of the node A increases and the avalanche multiplication stops at time t3, the voltage level of the node A does not drop any further.

When the avalanche multiplication in the photon detecting element 22 stops, a current that compensates the voltage drop flows from the node to which the voltage VL is supplied to the node A via the photon detecting element 22, and the voltage of the node A gradually increases. Then, at time t5, the node A is settled to the original voltage level.

The waveform shaping unit 32 binarizes the signal input from the node A according to a predetermined determination threshold value, and outputs the signal from the node B. Specifically, the waveform shaping unit 32 outputs a low-level signal from the node B when the voltage level of the node A exceeds the determination threshold value, and outputs a high-level signal from the node B when the voltage level of the node A is equal to or lower than the determination threshold value. For example, as illustrated in FIG. 5B, it is assumed that the voltage of the node A is equal to or lower than the determination threshold value during a period from time t2 to time t4. In this case, as illustrated in FIG. 5C, the signal level at the node B becomes the low level during a period from time t0 to the time t2, and during a period from the time t4 to time t5, and becomes the high level during the period from the time t2 to the time t4.

Thus, the analog signal input from the node A is shaped into a digital signal by the waveform shaping unit 32. A pulse signal output from the waveform shaping unit 32 in response to incidence of a photon on the photon detecting element 22 is a photon detecting pulse signal.

FIG. 6 is a diagram illustrating the configuration of the pixel 12 in more detail. In the description of FIG. 6, the description of the same portions as those in FIG. 3 or FIG. 5A is omitted or simplified. The digital processing circuit 34 includes a counter 342, a threshold determination unit 344, and an exposure control unit 346.

As described above, the counter 342 counts pulses based on photons incident on the photon detecting element 22, and holds the count value as a result of the counting. In order to hold the count value, the counter 342 has a bit memory capable of holding a digital signal having a plurality of bits. The count value held in the counter 342 is output to the data line 16 as a count value CNT via the pixel output circuit 36. The count value held in the counter 342 is also output to the threshold determination unit 344. The counter 342 resets held count value to an initial value at a timing corresponding to the pulse of a reset signal RES input from the exposure control unit 346.

The threshold determination unit 344 has a function of determining an event detection result based on the count value input from the counter 342 and a predetermined threshold value. The threshold determination unit 344 may be a digital circuit configured to perform comparison processing based on a count value that is a digital signal. The threshold determination unit 344 outputs an event detection result signal EDR indicating the determination result to the outside of the pixel signal processing unit 30. The event detection result signal EDR may be used for processing in the photoelectric conversion device 100, may be supplied to other pixels 12, or may be used for signal processing outside the photoelectric conversion device 100. The threshold determination unit 344 outputs the event detection result signal EDR to the exposure control unit 346.

The event determined in this processing means that the amount of light incident on the photon detecting element 22 of the pixel 12 satisfies a predetermined condition. The predetermined condition may be, for example, that the amount of light exceeds a predetermined threshold value or that the amount of change in the amount of light exceeds a predetermined threshold value. The photoelectric conversion device 100 according to the present embodiment has a function of detecting this event based on the count value and the threshold value and transitioning the state of the pixel 12.

The exposure control unit 346 has a function of changing the length of the count period (exposure time) in the counter 342 based on the event detection result signal EDR. The exposure control unit 346 may be a digital circuit including a counter for counting a timer clock signal TCLK. The timer clock signal TCLK is input to the exposure control unit 346 from the vertical scanning circuit unit 40, the control pulse generation unit 80, or the outside of the photoelectric conversion device 100. The exposure control unit 346 counts the number of pulses of the timer clock signal TCLK. When the counted number of pulses reaches a predetermined threshold value, the exposure control unit 346 outputs, to the counter 342, a pulse of the reset signal RES for resetting the count value held in the counter 342. The exposure control unit 346 can change the length of the count period by changing the count threshold value of the number of pulses of the timer clock signal TCLK based on the event detection result signal EDR.

With reference to FIGS. 7 and 8, a driving method of the pixels 12 at the time of event detection will be described. FIG. 7 is a flowchart illustrating processing of one pixel 12 in an event detection state (first state), which is the initial state, to detect an event and transition to an imaging state (second state). FIG. 8 illustrates the level of each signal in the process of FIG. 7. FIG. 8 illustrates the count value CNT, the reset signal RES, the event detection result signal EDR, and the timer clock signal TCLK.

In step S11, each pixel 12 in the photoelectric conversion device 100 is set in an event detection state. The event detection state is a mode in which a pixel signal based on incident light is acquired in a state in which power consumption is reduced as compared with a normal imaging state. The pixel signal acquired in the event detection state is mainly used for determining whether or not to perform a transition to the imaging state. A period before time t12 in FIG. 8 is a period in which each pixel 12 is in the event detection state. A period T1 in FIG. 8 is a count period from when the counter 342 is reset at time t11 to when the counter 342 is reset next at the time t12 in response to the reset signal RES. Each time one count period elapses, the pixel 12 outputs one count value based on the photons incident on the photon detecting element 22 within the count period. For example, after the elapse of the period T1, a count value C2 based on the photons detected in the period T1 is output from the pixel 12. Thus, the pixel 12 repeatedly outputs a count value every time the count period elapses.

In step S12, a count value is acquired by the counter 342 of the predetermined pixel 12, and the count value is input to the threshold determination unit 344 of the pixel. The pixels 12 whose count values are acquired in step S12 may be all of the pixels 12 in the pixel unit 10, a part of the pixels 12, or one pixel 12. The pixels 12 whose count values are acquired may be sequentially selected from among the pixel units 10.

In step S13, the threshold determination unit 344 determines whether or not the count value exceeds a predetermined threshold value. When the count value exceeds the predetermined threshold value (YES in step S13), it is determined that an event is detected, and the process proceeds to step S14. When the count value does not exceed the predetermined threshold value (NO in step S13), it is determined that no event is detected, and the process returns to step S12 to continue the event detection state. FIG. 8 illustrates operation timings when it is determined that the count value C2 does not exceed the threshold value at the time t11, and when it is determined that the count value C2 exceeds the threshold value at the time t12.

In step S14, the threshold determination unit 344 sets the event detection result signal EDR to the high level in accordance with a determination result indicating that the count value has exceeded a predetermined threshold value. This processing corresponds to the time t12 in FIG. 8. The exposure control unit 346 changes an interval between pulses of the reset signal RES based on the event detection result signal EDR. Thereby, the cycle of the reset in the counter 342 changes, and the count period changes. As described above, the pixel 12 transitions from the event detection state to the imaging state. A period after the time t12 in FIG. 8 is a period in which each pixel 12 is in the imaging state. A period T2 in FIG. 8 is a count period from when the counter 342 is reset at the time t12 to when the counter 342 is reset next at time t13 by the reset signal RES. As illustrated in FIG. 8, the length of the period T2, which is the count period in the imaging state, is shorter than the length of the period T1, which is the count period in the event detection state. The operation of the imaging state continues at times t13, t14 and the like after the time t12.

Note that the pixel 12 transitioning to the imaging state in step S14 may be only one pixel 12 whose count value is determined to exceed the threshold value, may be a group of pixels 12 including pixels around the one pixel 12, or may be all the pixels 12 in the pixel unit 10. The configuration in which only one pixel 12 whose count value is determined to exceed the threshold value transitions to the imaging state is desirable from the viewpoint of reducing power consumption. On the other hand, the configuration in which all the pixels 12 in the pixel unit 10 transition to the imaging state is desirable from the viewpoint that the entire region of the pixel unit 10 can transition to the imaging state at high speed. The configuration in which the group of pixels 12 transitions to the imaging state is desirable from the viewpoint of a balance between low power consumption and high speed processing. In this way, the number of pixels 12 to be transited to the imaging state in step S14 can be appropriately selected according to the required specification or the like.

As described above, the photoelectric conversion device 100 of the present embodiment includes the pixel 12 that transitions from the event detection state to the imaging state in accordance with the result of the determination based on the count value and the predetermined threshold value. The effect of this configuration will be described. The asynchronous photoelectric conversion device 100 is required to reduce power consumption. In particular, when the photoelectric conversion device 100 is used in an environment where power supply is limited, such as battery driving, there is a strong demand for low power consumption. In the present embodiment, as illustrated in FIG. 8, the count period is set longer in the event detection state than in the imaging state. Thereby, the frequency of outputting the count signal is reduced, and the power consumption of the photoelectric conversion device 100 in the event detection state is reduced.

In the detection pixel for event detection as disclosed in Japanese Patent Application Laid-Open No. 2020-096347, reduction of power consumption of the detection pixel itself is not considered. However, in the photoelectric conversion device 100 of the present embodiment, since each pixel 12 can operate in the event detection state and the imaging state, power consumption of the pixel itself used for event detection is reduced.

As described above, according to the present embodiment, the photoelectric conversion device 100 with reduced power consumption is provided.

Second Embodiment

Figure 9:
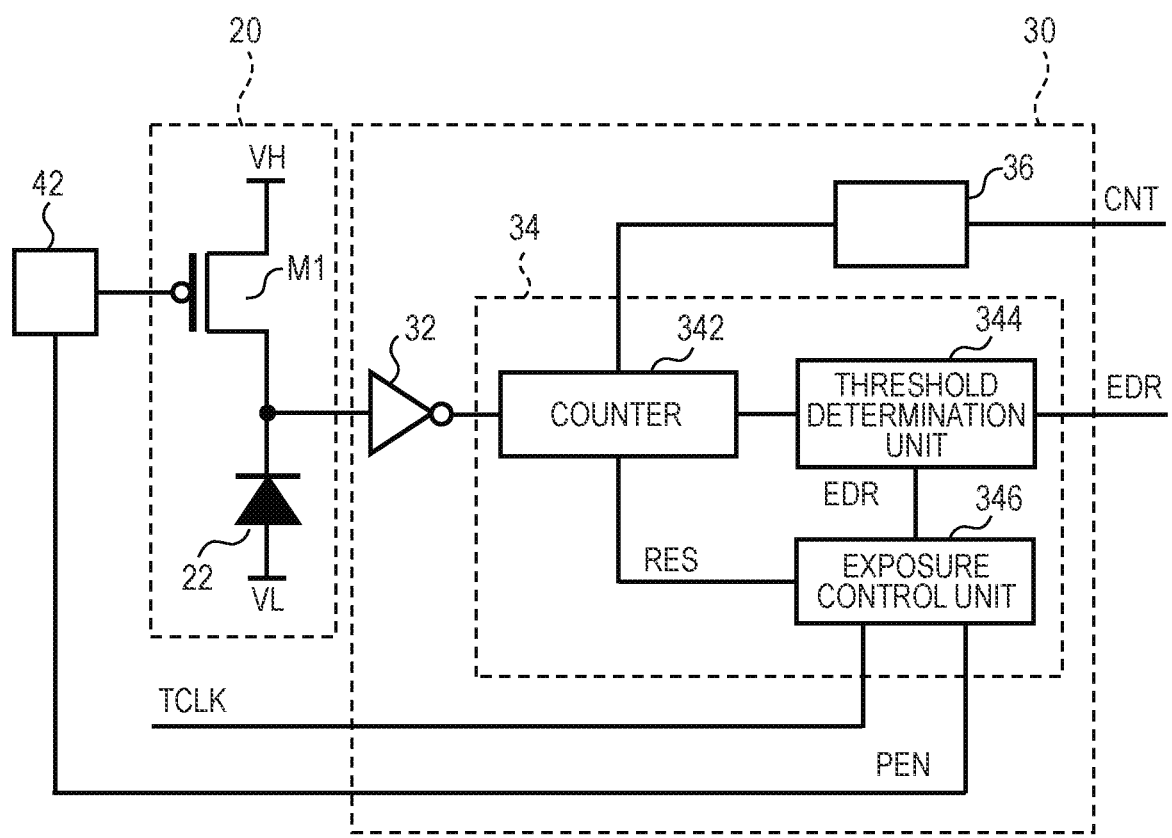
FIG. 9 is a block diagram illustrating a configuration example of the pixel in the photoelectric conversion device according to a second embodiment of the present disclosure.
Figure 10:
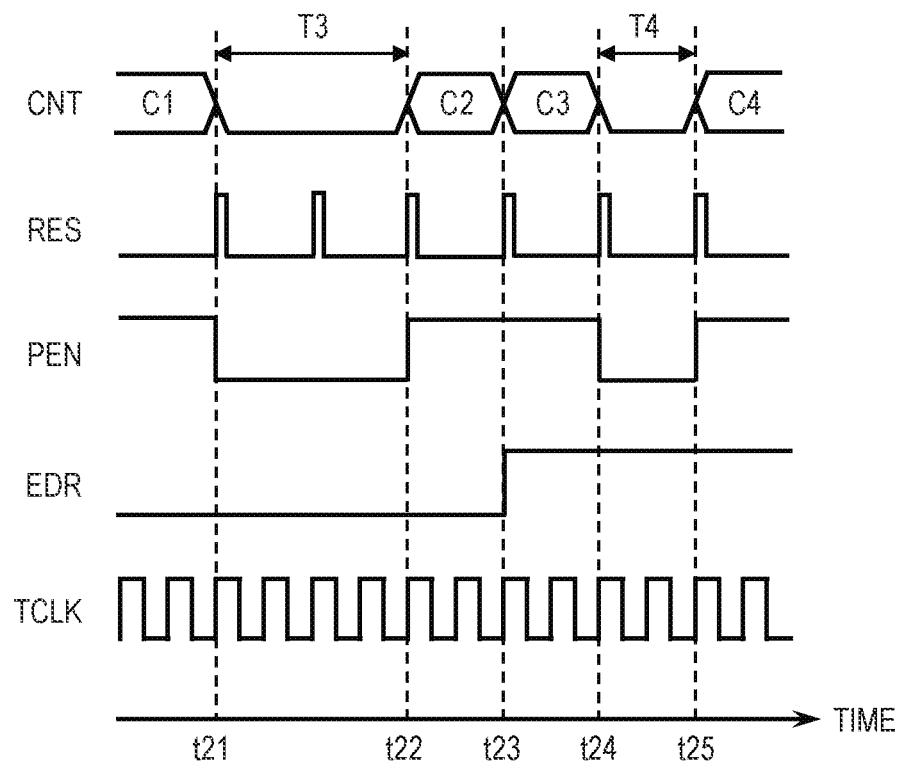
FIG. 10 is a timing chart illustrating an example of a pixel driving method in the photoelectric conversion device according to the second embodiment of the present disclosure.

A photoelectric conversion device according to a second embodiment of the present disclosure will be described with reference to FIGS. 9 and 10. FIG. 9 is a block diagram illustrating a configuration example of a pixel of the photoelectric conversion device according to the present embodiment. FIG. 10 is a timing chart illustrating an example of a pixel driving method in the photoelectric conversion device according to the present embodiment.

The photoelectric conversion device of the present embodiment is different from the photoelectric conversion device of the first embodiment in that the quenching element 24 is a PMOS transistor and the quenching element 24 can be set to a non-operating state.

As illustrated in FIG. 9, the photoelectric conversion unit 20 includes a quenching transistor M1 as an example of the quenching element 24. The quenching transistor M1 is a PMOS transistor. The pixel 12 includes a pixel control unit 42 that controls the quenching transistor M1.

The drain of the quenching transistor M1 is connected to the cathode of the APD constituting the photon detecting element 22. The source of the quenching transistor M1 is connected to a node to which the voltage VH is supplied. The gate of the quenching transistor M1 is connected to the pixel control unit 42. In the present embodiment, the exposure control unit 346 outputs a control signal PEN to the pixel control unit 42. The pixel control unit 42 controls the quenching transistor M1 to be turned on or off by changing the level of the voltage supplied to the gate of the quenching transistor M1 based on the control signal PEN. The pixel control unit 42 may include, for example, an inverter circuit.

A method of driving the pixels 12 at the time of event detection will be described with reference to FIG. 10. Since the process of the driving method is the same as that in FIG. 7, the description thereof will be omitted. FIG. 10 illustrates a control signal PEN in addition to the same signals as in FIG. 8.

During a period before time t21, a period from time t22 to time t24, and a period from time t25, the control signal PEN is at the high level. During these periods, the quenching transistor M1 is controlled to be on, and the count values CNT are sequentially output. The control signal PEN is at the low level during a period from the time t21 to the time t22 and during a period from the time t24 to the time t25. During these periods, the quenching transistor M1 is controlled to be off, and the output of the count value CNT is stopped. By performing the decimation operation in which the output of the count value CNT is stopped in a part of the period, power consumption is reduced.

FIG. 10 illustrates operation timings when it is determined that a count value C1 does not exceed the threshold value at the time t21 and when it is determined that a count value C2 exceeds the threshold value at the time t23. Therefore, the event detection result signal EDR is at the low level during the period before the time t23, and the event detection result signal EDR is at the high level during the period after the time t23. That is, the pixel 12 is in the event detection state in the period before the time t23, and the pixel 12 is in the imaging state in the period after the time t23.

As illustrated in FIG. 10, the length of a period T4 that is the stop period of the count signal in the imaging state is shorter than the length of a period T3 that is the stop period of the count signal in the event detection state. That is, the interval between the count periods in the imaging state is shorter than the interval between the count periods in the event detection state.

In the present embodiment, as illustrated in FIG. 10, the interval of the count period is set longer in the event detection state than in the imaging state. As a result, similarly to the first embodiment, the frequency of output of the count signal in the event detection state is reduced, and the power consumption of the photoelectric conversion device 100 in the event detection state is reduced.

As described above, according to the present embodiment, the photoelectric conversion device 100 with reduced power consumption is provided.

In the example of FIG. 10, the length of the count period is the same between the event detection state and the imaging state. However, by changing the length of the count period based on the event detection result signal EDR as in the first embodiment, the length of the count period in the event detection state and the length of the count period in the imaging state may be made different.

Third Embodiment

Figure 11:
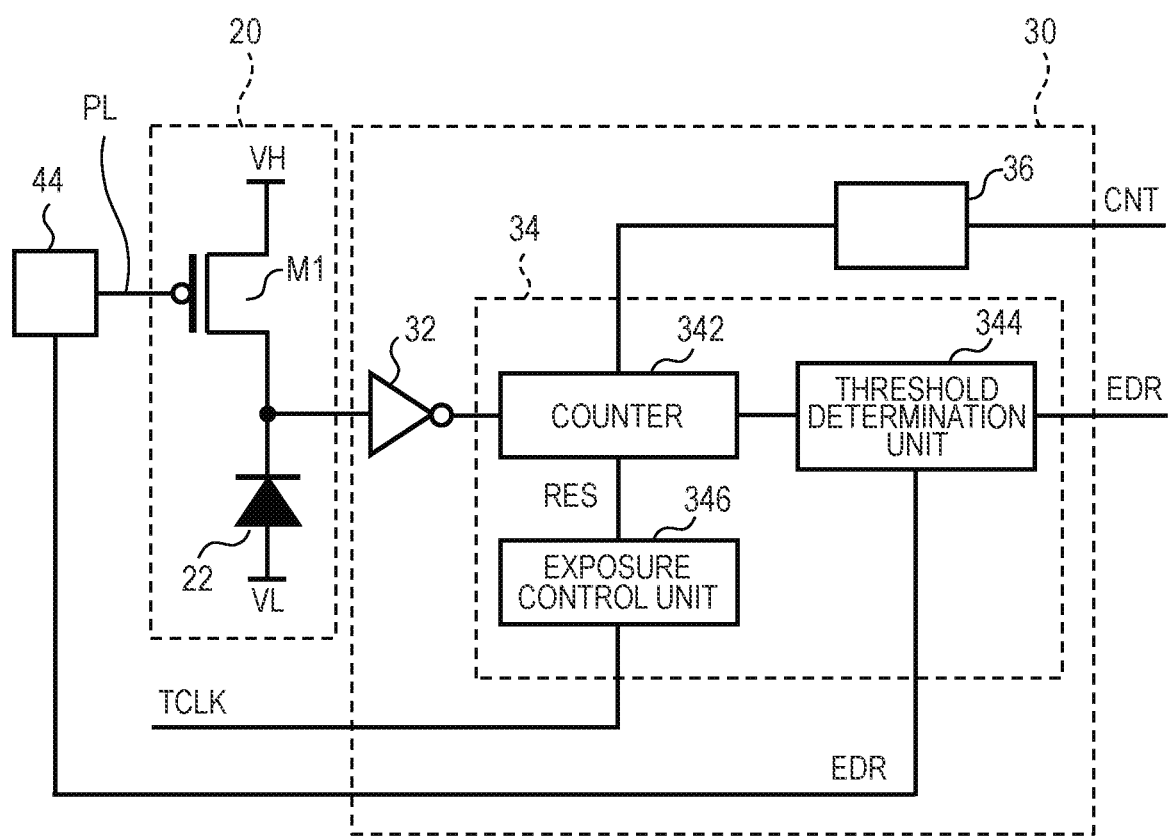
FIG. 11 is a block diagram illustrating a configuration example of the pixel in the photoelectric conversion device according to a third embodiment of the present disclosure.
Figure 12:
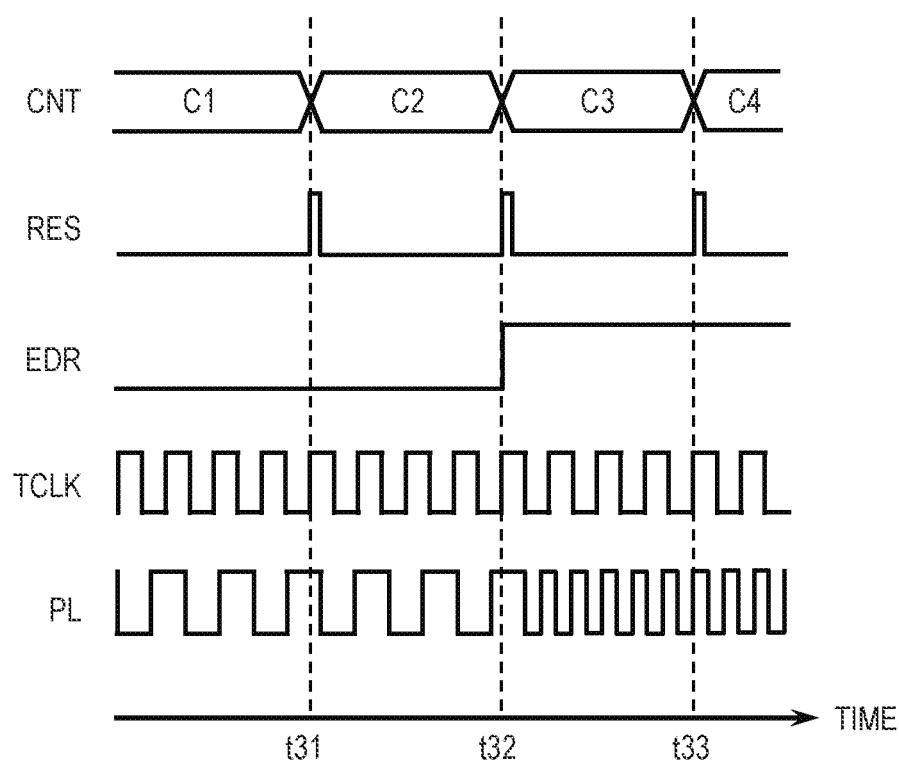
FIG. 12 is a timing chart illustrating an example of a pixel driving method in the photoelectric conversion device according to the third embodiment of the present disclosure.
Figure 13:
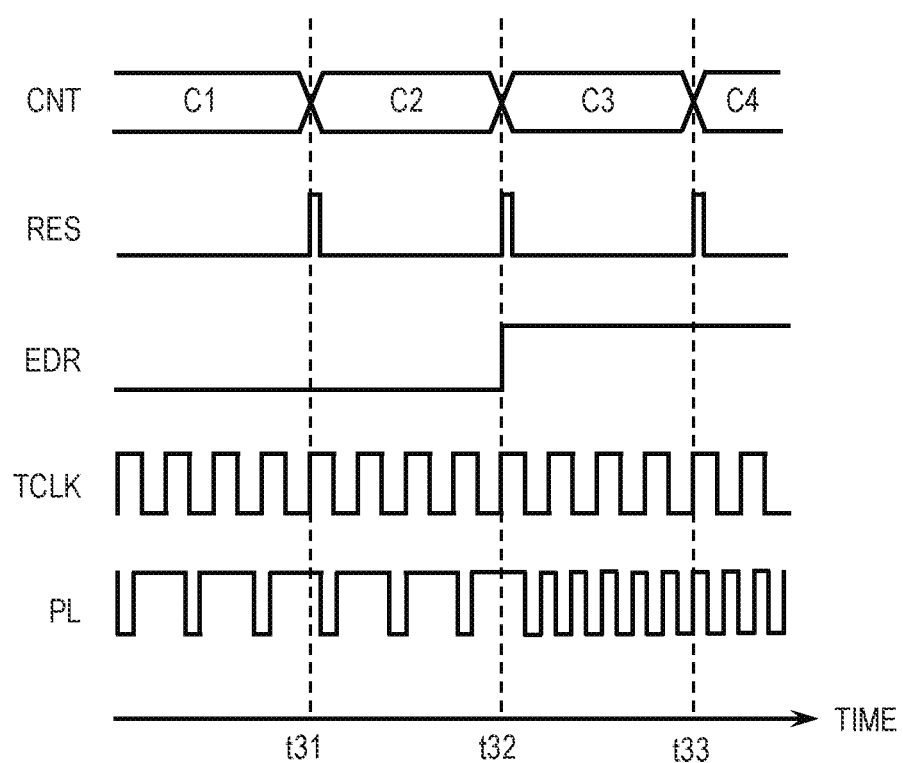
FIG. 13 is a timing chart illustrating a modified example of the pixel driving method in the photoelectric conversion device according to the third embodiment of the present disclosure.

A photoelectric conversion device according to a third embodiment of the present disclosure will be described with reference to FIGS. 11 to 13. FIG. 11 is a block diagram illustrating a configuration example of a pixel of the photoelectric conversion device according to the present embodiment. FIG. 12 is a timing chart illustrating an example of a pixel driving method in the photoelectric conversion device according to the present embodiment. FIG. 13 is a timing chart illustrating a modified example of the pixel driving method in the photoelectric conversion device according to the present embodiment.

In the photoelectric conversion device of the present embodiment, the quenching transistor M1 is arranged as the quenching element 24 as in the second embodiment. The photoelectric conversion device of the present embodiment is different from the photoelectric conversion device of the second embodiment in that a recharging operation is repeatedly performed at the frequency of the pulse signal by inputting the pulse signal to the gate of the quenching transistor M1.

As illustrated in FIG. 11, the photoelectric conversion unit 20 includes a quenching transistor M1 as an example of the quenching element 24. The quenching transistor M1 is a PMOS transistor. The pixel 12 includes a pulse generation unit 44 that controls the quenching transistor M1.

The gate of the quenching transistor M1 is connected to the pulse generation unit 44. In the present embodiment, the threshold determination unit 344 outputs the event detection result signal EDR to the pulse generation unit 44. The pulse generation unit 44 outputs a pulse signal to the gate of the quenching transistor M1, thereby switching on and off of the quenching transistor M1 at the frequency of the pulse signal. Thus, the quenching transistor M1 can perform a recharging operation of returning the voltage of the node of the cathode of the APD constituting the photon detecting element 22 at the frequency of the pulse signal. The pulse generation unit 44 may include, for example, a frequency divider circuit that divides a clock signal in the photoelectric conversion device 100 to generate a pulse signal having a variable frequency. The pulse generation unit 44 can change the frequency of the output pulse signal based on the event detection result signal EDR.

In the photoelectric conversion device 100 having the above-described configuration, when at least one photon is incident on the photon detecting element 22 during a photon detection waiting period from when the recharging operation is performed until when the next recharging operation is performed, the count value held in the counter 342 is increased by one. When no photon is incident on the photon detecting element 22 during the photon detection waiting period, the count value held in the counter 342 does not increase. Thus, the counter 342 can count the number of periods during which a photon is incident and avalanche multiplication occurs among the plurality of photon detection waiting periods. Since the number of photon detection waiting periods and the length of one photon detection waiting period change according to the frequency of the pulse signal, the frequency of photon count by the counter 342 changes by changing the frequency of the pulse signal.

A method of driving the pixels 12 at the time of event detection will be described with reference to FIG. 12. Since the process of the driving method is the same as that in FIG. 7, the description thereof will be omitted. FIG. 12 illustrates a pulse signal PL in addition to the same signals as in FIG. 8.

FIG. 12 illustrates operation timings when it is determined that a count value C1 does not exceed the threshold value at time t31 and when it is determined that a count value C2 exceeds the threshold value at time t32. Therefore, the event detection result signal EDR is at the low level during a period before the time t32, and the event detection result signal EDR is at the high level during a period after the time t32. That is, the pixel 12 is in the event detection state in the period before the time t32, and the pixel 12 is in the imaging state in the period after the time t32. As illustrated in FIG. 12, the frequency of the pulse signal PL in the imaging state is higher than the frequency of the pulse signal PL in the event detection state.

In the present embodiment, as illustrated in FIG. 12, the frequency of the pulse signal PL in the event detection state is set lower than that in the imaging state. Thereby, the frequency of counting in the event detection state is reduced, and the power consumption of the photoelectric conversion device 100 in the event detection state is reduced.

As described above, according to the present embodiment, the photoelectric conversion device 100 with reduced power consumption is provided.

After the transition to the imaging state, the count cycle of the photons can be shortened by increasing the frequency of the pulse signal PL. This makes it possible to perform imaging corresponding to a situation in which the amount of light changes in a short time, such as detection of light emission in a monitoring state in a dark place.

In the example of FIG. 12, the length of the count period is the same between the event detection state and the imaging state. However, by changing the length of the count period based on the event detection result signal EDR as in the first embodiment, the length of the count period in the event detection stale and the length of the count period in the imaging state may be made different.

Next, a modified example of the present embodiment will be described with reference to FIG. 13. In the example of FIG. 12, when the frequency of the pulse signal PL is changed at the time t32, the pulse width and the pulse period of the pulse signal PL change at the same ratio. In other words, the duty ratio of the pulse signal PL is constant. Since such a change in frequency can be realized by a relatively simple frequency divider circuit, it is desirable from the viewpoint of simplifying the circuit configuration of the pulse generation unit 44. However, the pulse signal PL is not limited to one having a constant duty ratio.

In the example of FIG. 13, when the frequency of the pulse signal PL is changed, the length of the low-level period of the pulse signal PL is the same between the event detection state and the imaging state. As described above, the period during which the pulse signal is at the low level is the recharging period during which the quenching transistor M1 is turned on. Thereby, the length of the period of the recharging operation becomes constant, and the recharging operation is stabilized. Therefore, in the modified example of FIG. 13, the signal quality may be improved. When the quenching transistor M1 is an NMOS transistor or the like, the recharging operation may be performed when the pulse signal PL is at the high level. In this case, it is desirable that the length of the high-level period of the pulse signal PL be the same between the event detection state and the imaging state.

Fourth Embodiment

Figure 14:
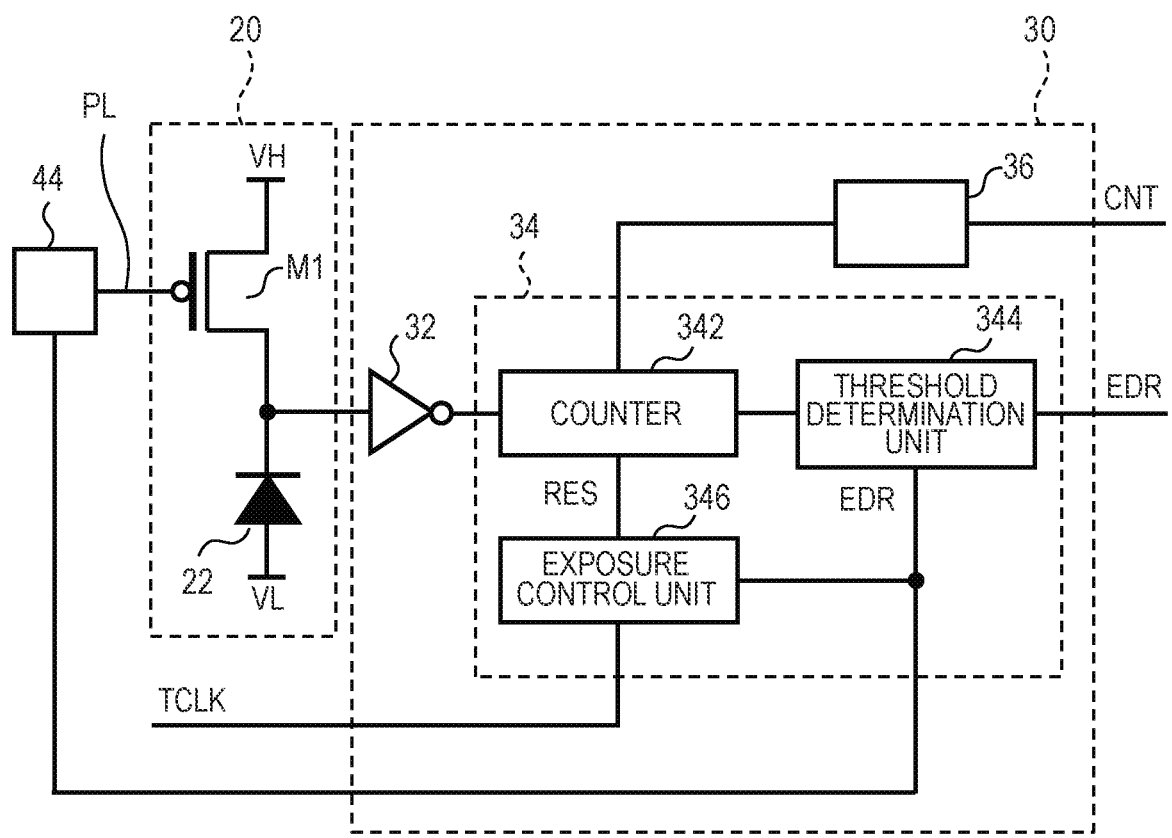
FIG. 14 is a block diagram illustrating a more specific configuration example of the pixel in the photoelectric conversion device according to a fourth embodiment of the present disclosure.
Figure 15:
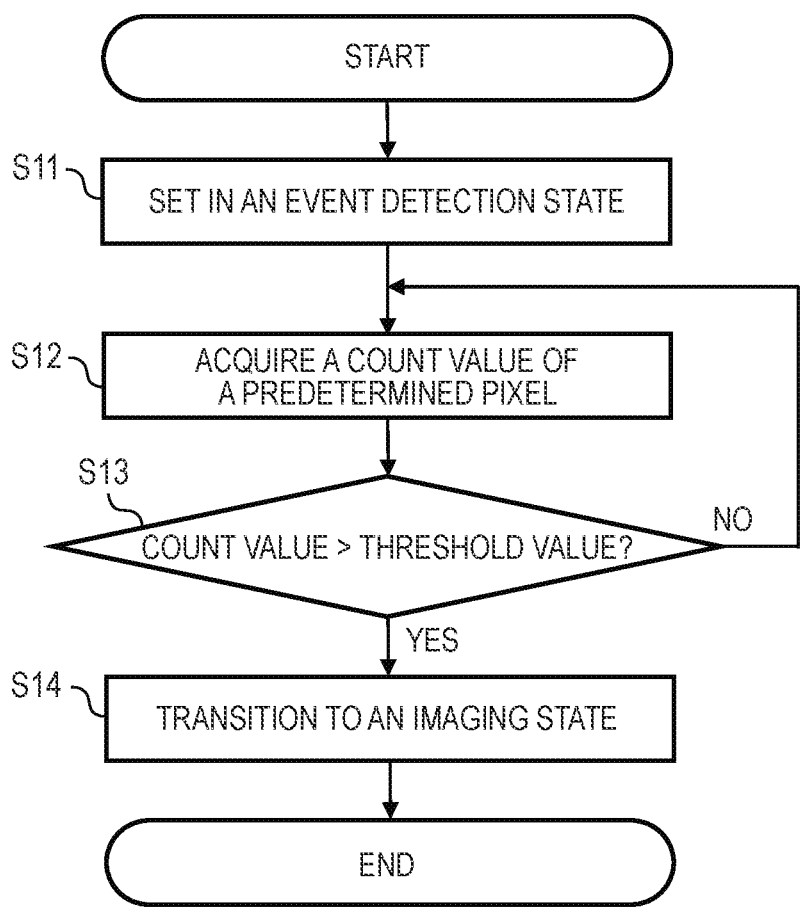
FIG. 15 is a flowchart illustrating an example of a driving method in the photoelectric conversion device according to the fourth embodiment of the present disclosure.
Figure 16:
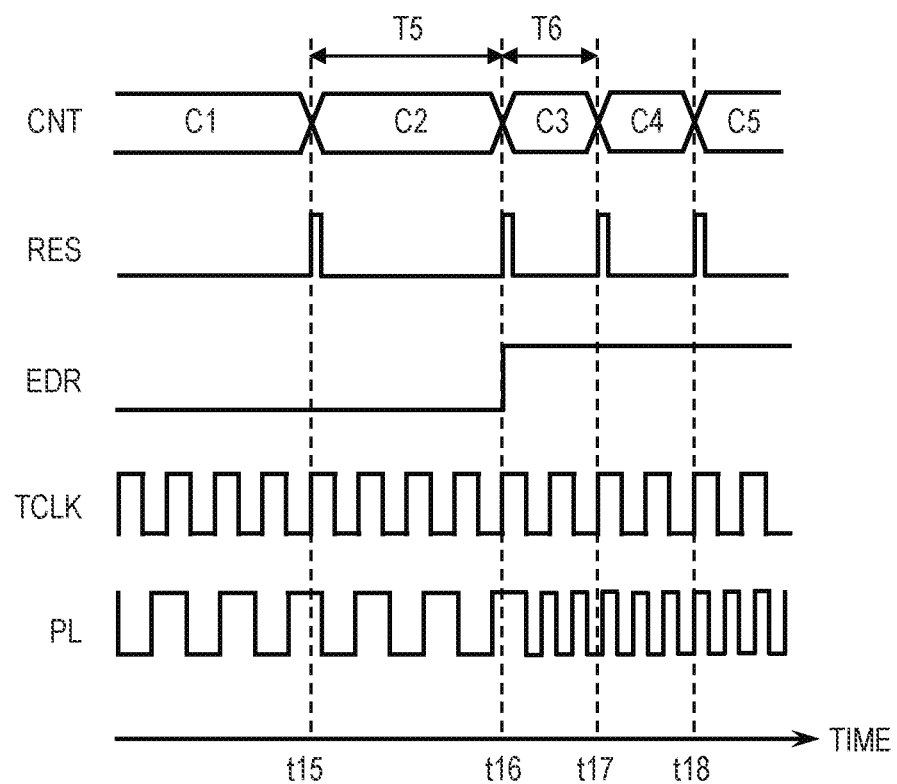
FIG. 16 is a timing chart illustrating an example of a pixel driving method in the photoelectric conversion device according to the fourth embodiment of the present disclosure.
Figure 17:
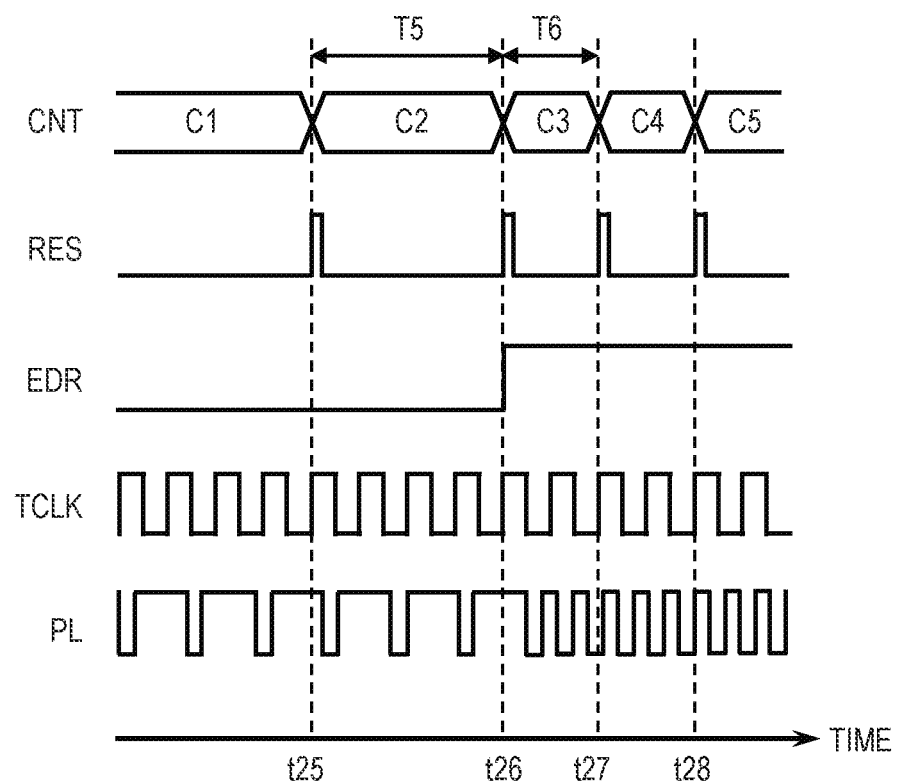
FIG. 17 is a timing chart illustrating a modified example of the pixel driving method in the photoelectric conversion device according to the fourth embodiment of the present disclosure.

A photoelectric conversion device according to a fourth embodiment of the present disclosure will be described with reference to FIGS. 14 to 17. FIG. 14 is a block diagram illustrating a more specific configuration example of a pixel in the photoelectric conversion device according to the present embodiment. FIG. 15 is a flowchart illustrating an example of a driving method in the photoelectric conversion device according to the present embodiment. FIG. 16 is a timing chart illustrating an example of a pixel driving method in the photoelectric conversion device according to the present embodiment. FIG. 17 is a timing chart illustrating a modified example of the pixel driving method in the photoelectric conversion device according to the present embodiment. A description of a configuration to which any one of the first to third embodiments can be applied may be omitted. For example, the configurations of FIGS. 1 to 5C can also be applied to the present embodiment.

FIG. 14 is a diagram illustrating the configuration of the pixel 12 in more detail. In the description of FIG. 14, the description of the same portions as those in FIG. 3 or FIG. 5A is omitted or simplified. The digital processing circuit 34 includes a counter 342, a threshold determination unit 344, and an exposure control unit 346. The photoelectric conversion unit 20 includes a quenching transistor M1 as an example of the quenching element 24. The quenching transistor M1 is a PMOS transistor. The pixel 12 includes a pulse generation unit 44 that controls the quenching transistor M1.

The drain of the quenching transistor M1 is connected to the cathode of the APD constituting the photon detecting element 22. The source of the quenching transistor M1 is connected to a node to which the voltage VH is supplied. The gate of the quenching transistor M1 is connected to the pulse generation unit 44. When the pulse signal PL is input from the pulse generation unit 44 to the gate of the quenching transistor M1, the recharging operation is repeatedly performed at the frequency of the pulse signal.

As described above, the counter 342 counts pulses based on photons incident on the photon detecting element 22, and holds the count value as a result of the counting. In order to hold the count value, the counter 342 has a bit memory capable of holding a digital signal having a plurality of bits. The count value held in the counter 342 is output to the data line 16 as a count value CNT via the pixel output circuit 36. The count value held in the counter 342 is also output to the threshold determination unit 344. The counter 342 resets held count value to an initial value at a timing corresponding to the pulse of the reset signal RES input from the exposure control unit 346.

The threshold determination unit 344 has a function of determining an event detection result based on the count value input from the counter 342 and a predetermined threshold value. The threshold determination unit 344 may be a digital circuit configured to perform comparison processing based on a count value that is a digital signal. The threshold determination unit 344 outputs an event detection result signal EDR indicating the determination result to the outside of the pixel signal processing unit 30. The event detection result signal EDR may be used for processing in the photoelectric conversion device 100, may be supplied to other pixels 12, or may be used for signal processing outside the photoelectric conversion device 100. The threshold determination unit 344 outputs the event detection result signal EDR to the exposure control unit 346 and the pulse generation unit 44.

The event determined in this processing means that the amount of light incident on the photon detecting element 22 of the pixel 12 satisfies a predetermined condition. The predetermined condition may be, for example, that the amount of light exceeds a predetermined threshold value or that the amount of change in the amount of light exceeds a predetermined threshold value. The photoelectric conversion device 100 according to the present embodiment has a function of detecting this event based on the count value and the threshold value and transitioning the state of the pixel 12.

The pulse generation unit 44 outputs a pulse signal to the gate of the quenching transistor M1, thereby switching on and off of the quenching transistor M1 at the frequency of the pulse signal. Thus, the quenching transistor M1 can perform a recharging operation of returning the voltage of the node of the cathode of the APD constituting the photon detecting element 22 at the frequency of the pulse signal. The pulse generation unit 44 may include, for example, a frequency divider circuit that divides a clock signal in the photoelectric conversion device 100 to generate a pulse signal having a variable frequency. The pulse generation unit 44 can change the frequency of the output pulse signal based on the event detection result signal EDR.

In the photoelectric conversion device 100 having the above-described configuration, when at least one photon is incident on the photon detecting element 22 during a photon detection waiting period from when the recharging operation is performed until when the next recharging operation is performed, the count value held in the counter 342 is increased by one. When no photon is incident on the photon detecting element 22 during the photon detection waiting period, the count value held in the counter 342 does not increase. Thus, the counter 342 can count the number of periods during which a photons is incident and avalanche multiplication occurs among the plurality of photon detection waiting periods. Since the number of photon detection waiting periods and the length of one photon detection waiting period change according to the frequency of the pulse signal, the frequency of photon count by the counter 342 changes by changing the frequency of the pulse signal.

The exposure control unit 346 has a function of changing the length of the count period (exposure time) in the counter 342 based on the event detection result signal EDR. The exposure control unit 346 may be a digital circuit including a counter for counting a timer clock signal TCLK. The timer clock signal TCLK is input to the exposure control unit 346 from the vertical scanning circuit unit 40, the control pulse generation unit 80, or the outside of the photoelectric conversion device 100. The exposure control unit 346 counts the number of pulses of the timer clock signal TCLK. When the counted number of pulses reaches a predetermined threshold value, the exposure control unit 346 outputs, to the counter 342, a pulse of the reset signal RES for resetting the count value held in the counter 342. The exposure control unit 346 can change the length of the count period by changing the count threshold value of the number of pulses of the timer clock signal TCLK based on the event detection result signal EDR.

With reference to FIGS. 15 and 16, a driving method of the pixels 12 at the time of event detection will be described. FIG. 15 is a flowchart illustrating processing of one pixel 12 in an event detection state (first state), which is the initial state, to detect an event and transition to an imaging state (second state). FIG. 16 illustrates the level of each signal in the process of FIG. 15. FIG. 16 illustrates the count value CNT, the reset signal RES, the event detection result signal EDR, the timer clock signal TCLK, and the pulse signal PL.

In step S11, each pixel 12 in the photoelectric conversion device 100 is set in an event detection state. The event detection state is a mode in which a pixel signal based on incident light is acquired in a state in which power consumption is reduced as compared with a normal imaging state. The pixel signal acquired in the event detection state is mainly used for determining whether or not to perform a transition to the imaging state. A period before time t16 in FIG. 16 is a period in which each pixel 12 is in the event detection state. A period T5 in FIG. 16 is a count period from when the counter 342 is reset at time t15 to when the counter 342 is reset next at the time t16 in response to the reset signal RES. Each time one count period elapses, the pixel 12 outputs one count value based on the photons incident on the photon detecting element 22 within the count period. For example, after the elapse of the period T5, a count value C2 based on the photons detected in the period T5 is output from the pixel 12. Thus, the pixel 12 repeatedly outputs a count value every time the count period elapses.

In step S12, a count value is acquired by the counter 342 of the predetermined pixel 12, and the count value is input to the threshold determination unit 344 of the pixel. The pixels 12 whose count values are acquired in step S12 may be all of the pixels 12 in the pixel unit 10, a part of the pixels 12, or one pixel 12. The pixels 12 whose count values are acquired may be sequentially selected from among the pixel units 10.

In step S13, the threshold determination unit 344 determines whether or not the count value exceeds a predetermined threshold value. When the count value exceeds the predetermined threshold value (YES in step S13), it is determined that an event is detected, and the process proceeds to step S14. When the count value does not exceed the predetermined threshold value (NO in step S13), it is determined that no event is detected, and the process returns to step S12 to continue the event detection state. FIG. 16 illustrates operation timings when it is determined that the count value C2 does not exceed the threshold value at the time t15 and when it is determined that the count value C2 exceeds the threshold value at the time t16.

In step S14, the threshold determination unit 344 sets the event detection result signal EDR to the high level in accordance with a determination result indicating that the count value has exceeded a predetermined threshold value. This processing corresponds to the time t16 in FIG. 16. The exposure control unit 346 changes an interval between pulses of the reset signal RES based on the event detection result signal EDR. Thereby, the cycle of the reset in the counter 342 changes, and the count period changes. The pulse generation unit 44 changes the frequency of the pulse signal PL based on the event detection result signal EDR. The frame rate of the output of the count value CNT from the pixel signal processing unit 30 changes in response to the changes of the count period and the frequency. As described above, the pixel 12 transitions from the event detection state to the imaging state. A period after the time t16 in FIG. 16 is a period in which each pixel 12 is in the imaging state. A period T6 in FIG. 16 is a count period from when the counter 342 is reset at the time t16 to when the counter 342 is reset next at time t17 in response to the reset signal RES. As illustrated in FIG. 16, the length of the period T6 which is the count period in the imaging state is shorter than the length of the period T5 which is the count period in the event detection state. As illustrated in FIG. 16, the frequency of the pulse signal PL in the imaging state is higher than the frequency of the pulse signal PL in the event detection state. Accordingly, the frame rate in the imaging state is higher than the frame rate in the event detection state. The operation of the imaging state continues at times t17, t18 and the like after the time t16.

Note that the pixel 12 transitioning to the imaging state in step S14 may be only one pixel 12 whose count value is determined to exceed the threshold value, may be a group of pixels 12 including pixels around the one pixel 12, or may be all the pixels 12 in the pixel unit 10. The configuration in which only one pixel 12 whose count value is determined to exceed the threshold value transitions to the imaging state is desirable from the viewpoint of reducing power consumption. On the other hand, the configuration in which all the pixels 12 in the pixel unit 10 transition to the imaging state is desirable from the viewpoint that the entire region of the pixel unit 10 can transition to the imaging state at high speed. The configuration in which the group of pixels 12 transitions to the imaging state is desirable from the viewpoint of a balance between low power consumption and high speed processing. In this way, the number of pixels 12 to be transited to the imaging state in step S14 can be appropriately selected according to the required specification or the like.

As described above, the photoelectric conversion device 100 of the present embodiment includes the pixel 12 that transitions from the event detection state to the imaging state in accordance with the result of the determination based on the count value and the predetermined threshold value. The effect of this configuration will be described. The asynchronous photoelectric conversion device 100 is required to reduce power consumption. In particular, when the photoelectric conversion device 100 is used in an environment where power supply is limited, such as battery driving, there is a strong demand for low power consumption. In the present embodiment, as illustrated in FIG. 16, the count period in the event detection state is set longer than that in the imaging state, and the frequency of the pulse signal PL in the event detection state is set lower than that in the imaging state. Accordingly, the frame rate in the event detection state is reduced. Thereby, the frequency of counting and the frequency of outputting the count signal are reduced, and the power consumption of the photoelectric conversion device 100 in the event detection state is reduced.

In the detection pixel for event detection as disclosed in Japanese Patent Application Laid-Open No. 2020-096347, reduction of power consumption of the detection pixel itself is not considered. However, in the photoelectric conversion device 100 of the present embodiment, since each pixel 12 can operate in the event detection state and the imaging state, power consumption of the pixel itself used for event detection is reduced.

As described above, according to the present embodiment, the photoelectric conversion device 100 with reduced power consumption is provided.

Next, a modified example of the present embodiment will be described with reference to FIG. 17. In the example of FIG. 16, when the frequency of the pulse signal PL is changed at the time t16, the pulse width and the pulse period of the pulse signal PL change at the same ratio. In other words, the duty ratio of the pulse signal PL is constant. Since such a change in frequency can be realized by a relatively simple frequency divider circuit, it is desirable from the viewpoint of simplifying the circuit configuration of the pulse generation unit 44. However, the pulse signal PL is not limited to one having a constant duty ratio.

In the example of FIG. 17, when the frequency of the pulse signal PL is changed, the length of the low-level period of the pulse signal PL is the same between the event detection state before the time t26 and the imaging state after the time t26. As described above, the period during which the pulse signal is at the low level is the recharging period during which the quenching transistor M1 is turned on. Thereby, the length of the period of the recharging operation becomes constant, and the recharging operation is stabilized. Therefore, in the modified example of FIG. 17, the signal quality may be improved. When the quenching transistor M1 is an NMOS transistor or the like, the recharging operation may be performed when the pulse signal PL is at the high level. In this case, it is desirable that the length of the high-level period of the pulse signal PL be the same between the event detection state and the imaging state.

Fifth Embodiment

Figure 18:
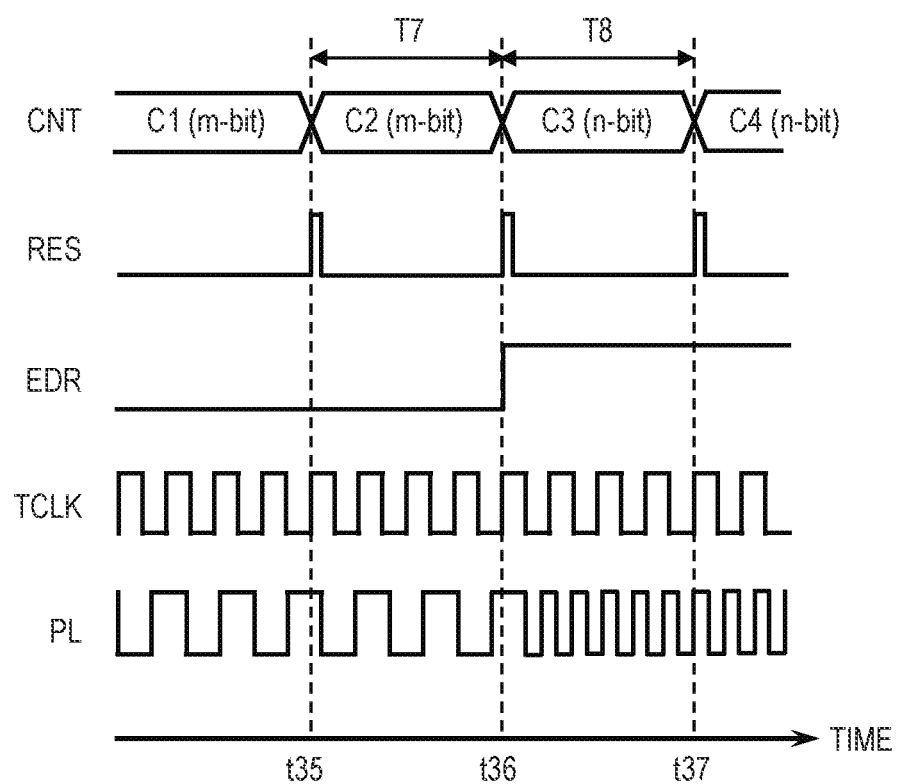
FIG. 18 is a timing chart illustrating an example of a pixel driving method in the photoelectric conversion device according to a fifth embodiment of the present disclosure.

A photoelectric conversion device according to a fifth embodiment of the present disclosure will be described with reference to FIG. 18. FIG. 18 is a timing chart illustrating an example of a pixel driving method in the photoelectric conversion device according to the present embodiment.

The photoelectric conversion device of the present embodiment is different from the photoelectric conversion device of the fourth embodiment in that the number of bits of the count value can be changed when a transition is made from the event detection state to the imaging state.

A method of driving the pixels 12 at the time of event detection will be described with reference to FIG. 18. Since the process of the driving method is the same as that in FIG. 15, description thereof is omitted. In FIG. 18, a signal similar to that in FIG. 16 is displayed, and the number of bits of the count value is indicated as "m-bit" and "n-bit" in the column of the count value CNT.

FIG. 18 illustrates operation timings when it is determined that a count value C1 does not exceed the threshold value at time t35 and when it is determined that a count value C2 exceeds the threshold value at time t36. Therefore, the event detection result signal EDR is at the low level during a period before the time t36, and the event detection result signal EDR is at the high level during a period after the time t36. That is, the pixel 12 is in the event detection state in a period before the time t36, and the pixel 12 is in the imaging state in a period after the time t36.

As illustrated in FIG. 18, the number of bits of the count values C1 and C2 in the event detection state is m bits, and the number of bits of count values C3 and C4 in the imaging state is n bits. Here, m is an integer of 1 or more, and n is an integer greater than m. In other words, the number of bits of the count value CNT in the imaging state is greater than the number of bits of the count value CNT in the event detection state. Further, as in the fourth embodiment, the frequency of the pulse signal PL in the imaging state is higher than the frequency of the pulse signal PL in the event detection state.

In the present embodiment, the frequency of the pulse signal PL in the event detection state is set lower than that in the imaging state, and the number of bits of the count value CNT in the event detection state is less than that in the imaging state. In the event detection state, by reducing the number of bits of the count value CNT, the computation load in the signal processing performed in a subsequent circuit than the counter 342 after the count value CNT is output can be reduced, and power consumption can be reduced. On the other hand, in the imaging state, the number of bits is increased more than in the event detection state, thereby enabling high-precision signal acquisition.

An example of a method of reducing the number of bits in the event detection state is to invalidate at least the least significant bit in the processing in a subsequent circuit than the counter 342, or not to output at least the least significant bit from the counter 342. In these cases, even if data of a bit near the lowest order is missing, the determination in step S13 can be performed if data of a bit near the determination threshold value is output. After the transition to the imaging state, the number of bits can be increased by canceling the invalidation or the stop of the output. By using such a method, the bit memory whose number of bits is adjusted for the imaging state can be used also in the event detection state.

In FIG. 18, a length of a period T8 which is the count period in the imaging state is the same as a length of a period T7 which is the count period in the event detection state. However, as in the fourth embodiment, the length of the period T8 which is the count period in the imaging state may be shorter than the length of the period T7 which is the count period in the event detection state. In this case, although the frame rate in the imaging state increases, the accuracy of the acquired signal decreases by shortening the count period. By appropriately setting the lengths of the periods T7 and T8 in consideration of the balance between the frame rate and the accuracy of the signal and the required characteristics, the driving method of the fourth embodiment and the driving method of the fifth embodiment can be suitably combined.

Sixth Embodiment

Figure 19:
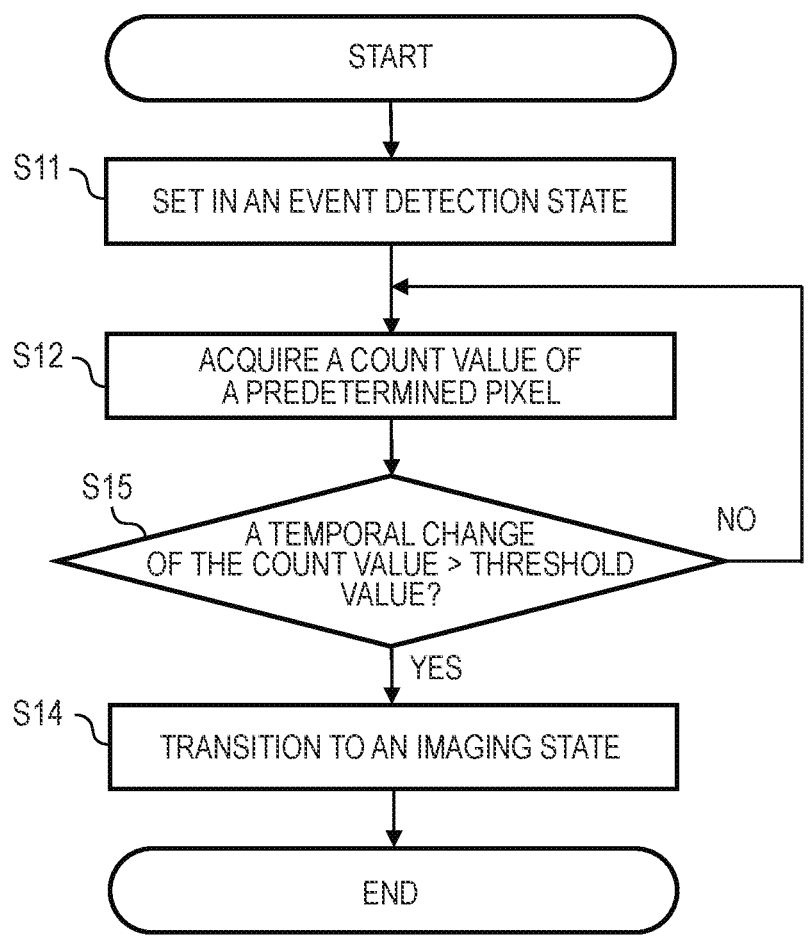
FIG. 19 is a flowchart illustrating an example of a driving method in the photoelectric conversion device according to a sixth embodiment of the present disclosure.

A photoelectric conversion device according to a sixth embodiment of the present disclosure will be described with reference to FIG. 19. FIG. 19 is a flowchart illustrating an example of a pixel driving method in the photoelectric conversion device according to the present embodiment.

The photoelectric conversion device of the present embodiment is different from the first embodiment in that the determination of the transition to the imaging state is performed based on the change amount of the count value. Since the disclosures of any one of the first to fifth embodiments can be applied to the other circuit configuration and driving method, description thereof will be omitted.

A method of driving the pixels 12 at the time of event detection will be described with reference to FIG. 19. Since the operations of steps S11, S12, and S14 are the same as those in FIG. 7, the description thereof will be omitted. In step S15, the threshold determination unit 344 determines whether or not a temporal change of the count value exceeds a predetermined threshold value. Here, assuming that this determination is made with respect to a count value output in the n-th count period, the temporal change may be a difference between count values obtained by subtracting a count value of the (n−1)-th count period from the count value of the n-th count period. When the temporal change of the count value exceeds the predetermined threshold value (YES in step S15), it is determined that an event is detected, and the process proceeds to step S14. When the temporal change of the count value does not exceed the predetermined threshold value (NO in step S15), it is determined that no event is detected, and the process returns to step S12 to continue the event detection state. In order to realize the subtraction processing as described above, the threshold determination unit 344 may include a memory for storing the count value output during the previous count period.

As described above, the photoelectric conversion device 100 of the present embodiment includes the pixel 12 that transition from the event detection state to the imaging state in accordance with the result of the determination based on the temporal change of the count value and the predetermined threshold value. In the asynchronous photoelectric conversion device 100, the temporal change in luminance may be more important than the luminance itself of the object. As an example of such a case, there is a situation in which a still object is monitored by the photoelectric conversion device 100 to detect a motion of the object. In the present embodiment, since the temporal change of the count value is used as the determination criterion, the determination can be made more appropriately in the above-described situation. Therefore, according to the present embodiment, the photoelectric conversion device 100 capable of performing more appropriate determination is provided.

In the above description, the count value of the n-th count period and the count value of the (n−1)-th count period are used as the calculation example of the temporal change, but the count value of the (n−2)-th count period may be further used.

When the luminance itself of the object is important, a criterion based on the count value itself as illustrated in FIG. 7 may be more desirable than a criterion based on the temporal change of the count value as illustrated in FIG. 19. By performing the determination by comparing the count value and the threshold value as illustrated in FIG. 7, it is possible to perform the determination more appropriately in a situation such as detecting the brightness of the imaging environment as an event.

Seventh Embodiment

Figure 20:
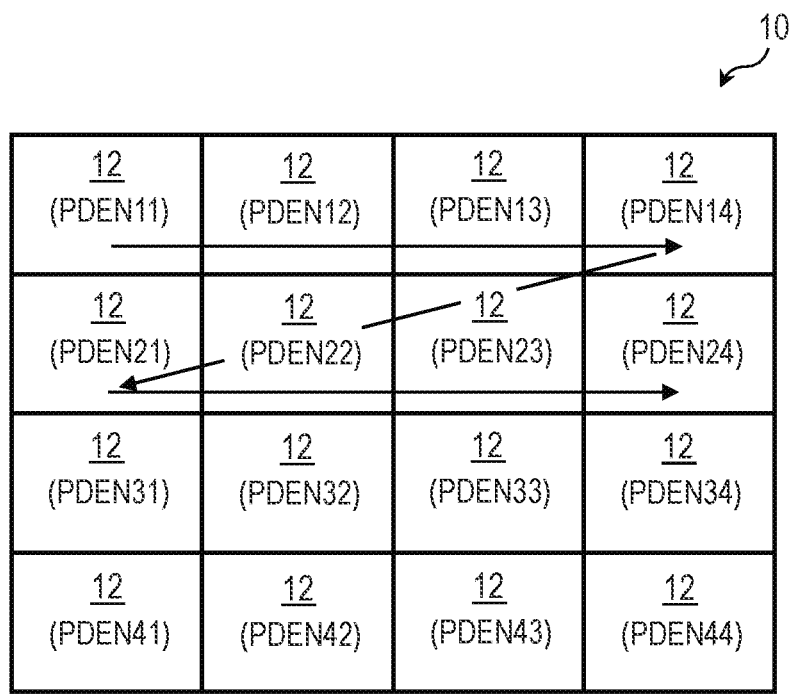
FIG. 20 is a schematic diagram illustrating an example of an arrangement and driving order of pixels in the photoelectric conversion device according to a seventh embodiment of the present disclosure.
Figure 21:
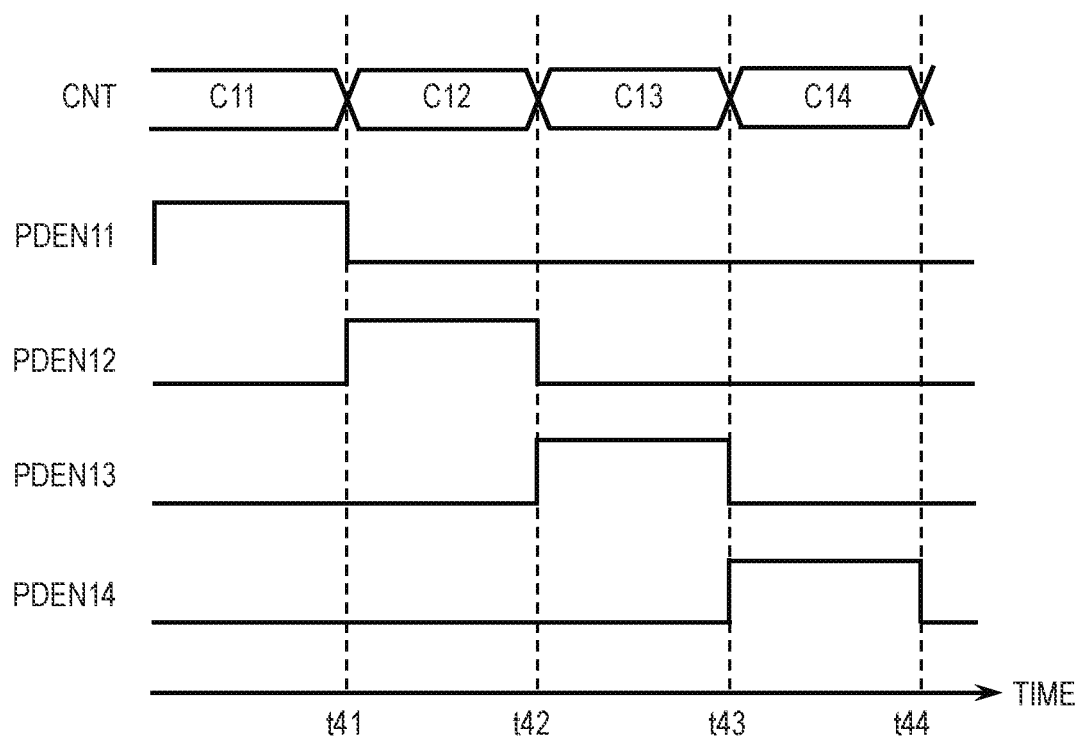
FIG. 21 is a timing chart illustrating an example of a pixel driving method in the photoelectric conversion device according to the seventh embodiment of the present disclosure.
Figure 22:
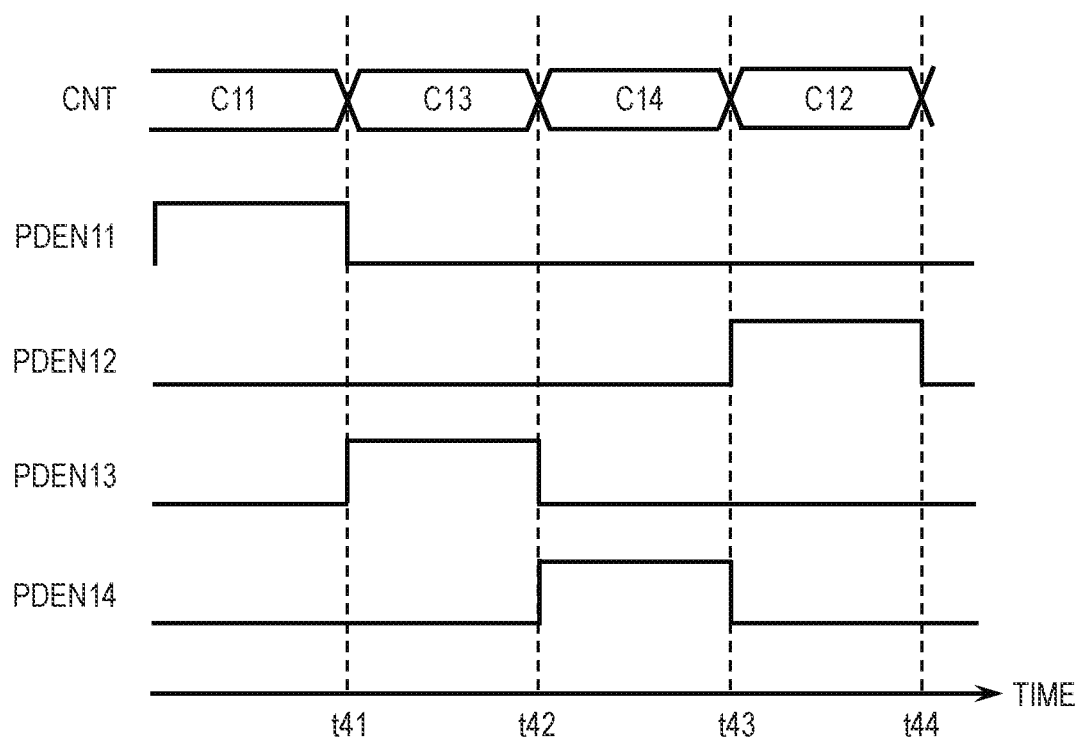
FIG. 22 is a timing chart illustrating a modified example of the pixel driving method in the photoelectric conversion device according to the seventh embodiment of the present disclosure.

A photoelectric conversion device according to a seventh embodiment of the present disclosure will be described with reference to FIGS. 20 to 22. FIG. 20 is a schematic diagram illustrating an example of an arrangement and driving order of pixels in the photoelectric conversion device according to the present embodiment. FIG. 21 is a timing chart illustrating an example of a pixel driving method in the photoelectric conversion device according to the present embodiment. FIG. 22 is a timing chart illustrating a modified example of the pixel driving method in the photoelectric conversion device according to the present embodiment.

The photoelectric conversion device of the present embodiment is a configuration example relating to a selection method of the pixels 12 in which an event detection process is performed. Since the disclosures of any one of the first to sixth embodiments can be applied to the other circuit configuration and driving method, description thereof will be omitted.

FIG. 20 schematically illustrates the arrangement of the pixels 12 in the pixel unit 10 and the driving order in the event detection state. In FIG. 20, only four rows by four columns of pixels 12 are illustrated fix simplicity of explanation, but this is illustrative, and in practice, more rows and columns may be used. "PDEN11" or the like in a box indicating the pixel 12 in FIG. 20 indicates a control signal for outputting a count value from each pixel 12. A two-digit numeric value such as "11" at the end of the control signal name indicates a row number and a column number. The arrows illustrated on the boxes indicating the pixels 12 in FIG. 20 indicate the scan order of the pixels 12. That is, the driving order in the event detection state of the present embodiment is as follows: pixel 12 of the first row and the first column→pixel 12 of the first row and the second column→pixel 12 of the first row and the third column→pixel 12 of the first row and the fourth column→pixel 12 of the second row and the first column→ . . . . As described above, in the present embodiment, the driving order corresponds to the arrangement of the plurality of pixels 12.

The selection of the pixel 12 which outputs the count value can be performed by a combination of two kinds of control signals that are a control signal output from the vertical scanning circuit unit 40 and a control signal output from the horizontal scanning circuit unit 60. However, in the present embodiment, for the sake of simplicity, it is assumed that the signal output from the pixel 12 is controlled by one control signal, and the control signals are illustrated in the figures.

FIG. 21 illustrates levels of the control signals PDEN11, PDEN12, PDEN13, and PDEN14 and the count value CNT for realizing the read order of FIG. 20. In the entire period of FIG. 21, it is assumed that each pixel 12 is in the event detection state. In a period before time t41, the control signal PDEN11 becomes the high level, and the pixel 12 of the first row and the first column is enabled. At the time t41, a count value C11 is output from the pixel 12 of the first row and the first column. A two-digit numeric value such as "11" at the end of the count value indicates a row number and a column number. At this time, the determination of event detection based on the count value C11 is performed by a method similar to that described in the above embodiment. During a period from the time t41 to time t42, the control signal PDEN12 becomes the high level, and the pixel 12 of the first row and the second is enabled. At the time t42, a count value C12 is output from the pixel 12 of the first row and the second column. At this time, the determination of event detection based on the count value C12 is performed by a method similar to that described in the above embodiment. Thereafter, similarly, every time the count period elapses, the output and the determination for the count values are sequentially performed in the corresponding pixel 12.

According to the present embodiment, it is possible to perform the determination that covers the entire pixel unit 10 by reducing the number of pixels 12 operating simultaneously to reduce power consumption and by sequentially operating the plurality of pixels 12 of the pixel unit 10. As a result, the photoelectric conversion device 100 capable of reducing power consumption and detecting an event with high accuracy is provided.

FIG. 22 is a modified example of the driving order of FIGS. 20 and 21. As illustrated in FIG. 22, the driving order in the present modified example is as follows: pixel 12 of the first row and the first column→pixel 12 of the first row and the third column→pixel 12 of the first row and the fourth column→pixel 12 of the first row and the second column→ . . . . As described above, in the present modified example, the driving order is random with respect to the arrangement of the plurality of pixels 12. Although FIG. 22 illustrates an example in which an order in one row is random, both the row and the column may be random in the driving order.

In an imaging environment such as a dark place where the number of incident photons is small, an area of the pixel unit 10 capable of detecting an event may be extremely narrow. In such a case, as in the example of FIG. 20, if the scanning is performed sequentially along the arrangement of the pixels 12, the probability of detecting an event may be low. By randomizing the order as in the present modified example, it is possible to improve the detection probability when the area of the pixel unit 10 capable of detecting an event is narrow.

Eighth Embodiment

Figure 23:
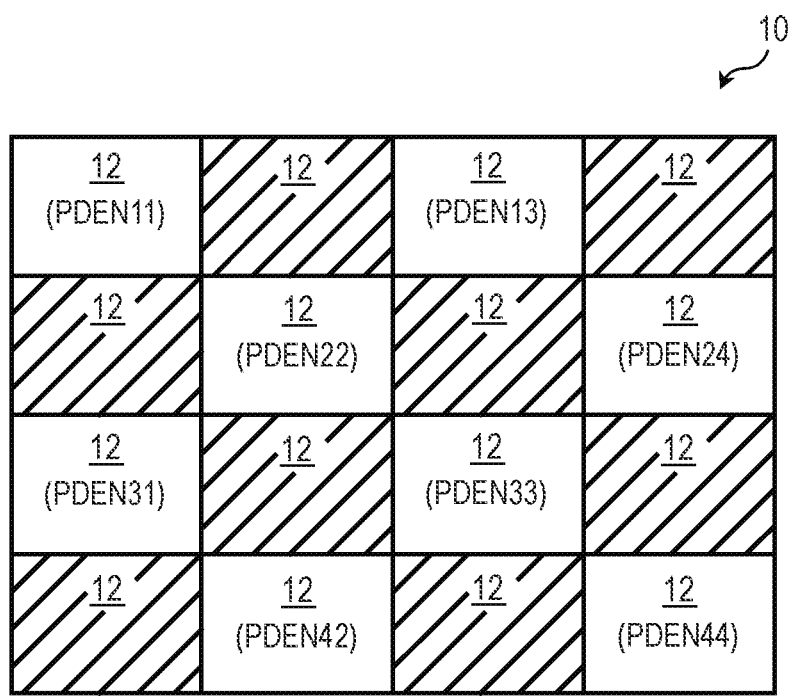
FIG. 23 is a schematic diagram illustrating an example of an arrangement of pixels and a driving method in the photoelectric conversion device according to an eighth embodiment of the present disclosure.

A photoelectric conversion device according to an eighth embodiment of the present disclosure will be described with reference to FIG. 23. FIG. 23 is a schematic diagram illustrating an example of an arrangement of pixels and a driving method in the photoelectric conversion device according to the present embodiment.

The photoelectric conversion device of the present embodiment is a configuration example relating to a selection method of the pixels 12 in which an event detection process is performed. Since the disclosures of any one of the first to seventh embodiments can be applied to the other circuit configuration and driving method, description thereof will be omitted.

FIG. 23 schematically illustrates an arrangement of the pixels 12 in the pixel unit 10 and whether the operation is enabled or disabled in the event detection state. In FIG. 23, hatched boxes indicate that output of count values and determination of event detection are not performed in the event detection state in the pixels 12. In the same manner as in any of the above-described embodiments, in the pixels 12 of the non-hatched boxes, output of count values and determination of event detection are performed in the event detection state.

In this way, in the event detection state, output of count values and determination of event detection are performed by decimating some of the pixels 12, whereby speeding up of the operation of event detection or reduction of power consumption is realized.

In FIG. 23, the hatched boxes are distributed in the pixel unit 10 in a checker pattern. By arranging the pixels 12 whose count values are not output and whose event detection is not determined, the distribution of the pixels 12 used in the event detection processing becomes uniform. However, the distribution of the pixels 12 in which the output of the count value and the determination of the event detection are not performed is not limited to that illustrated in FIG. 23.

Ninth Embodiment

Figure 24:
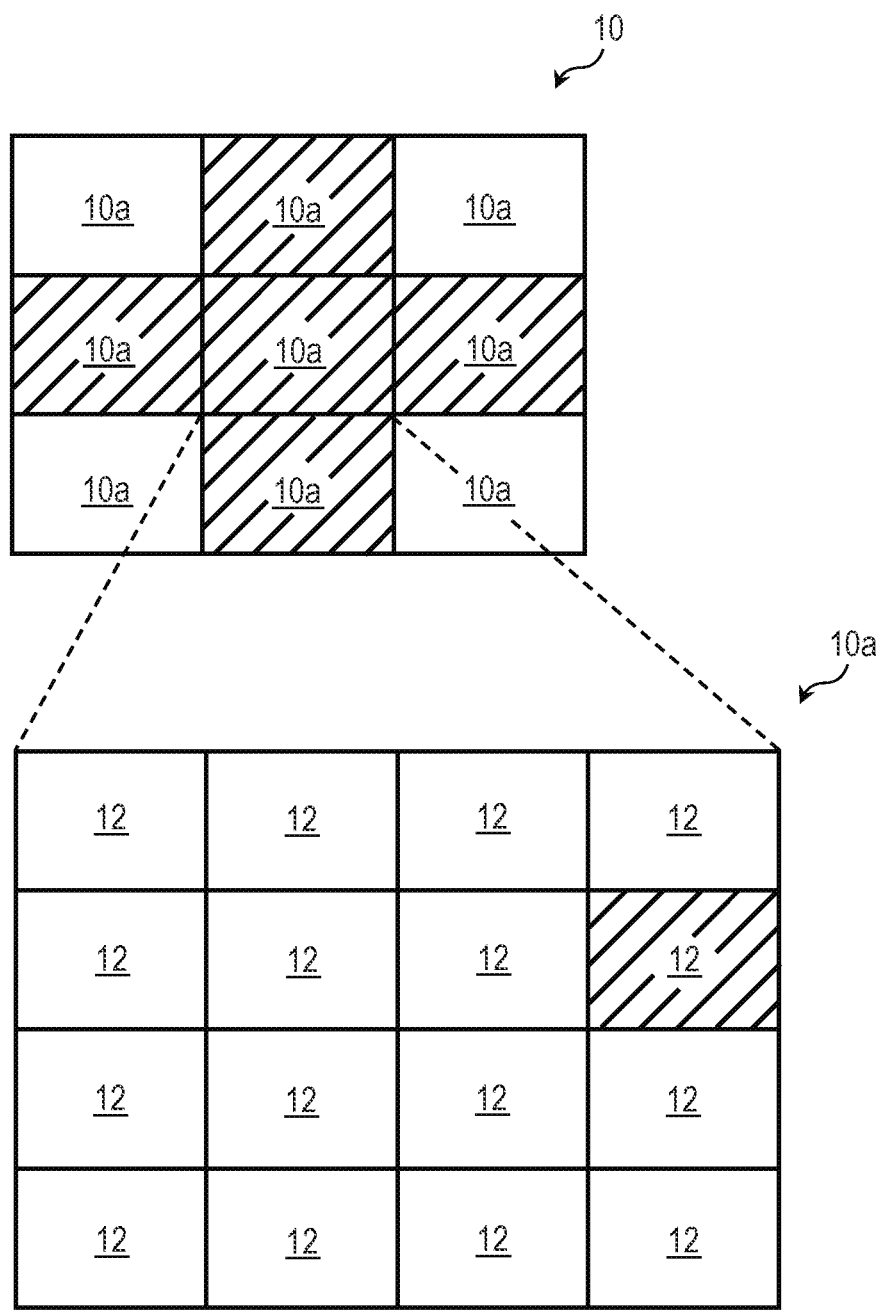
FIG. 24 is a schematic diagram illustrating an example of an arrangement of pixels and a driving method in the photoelectric conversion device according to a ninth embodiment of the present disclosure.
Figure 25:
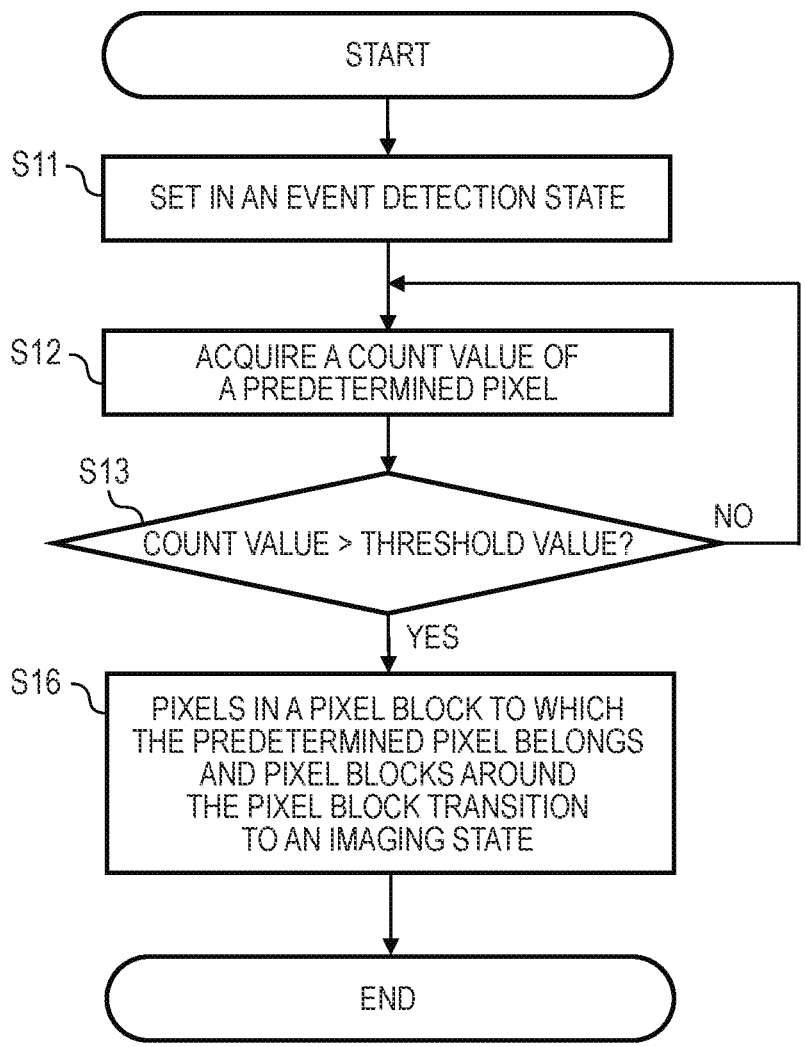
FIG. 25 is a flowchart illustrating an example of a driving method in the photoelectric conversion device according to the ninth embodiment of the present disclosure.
Figure 26:
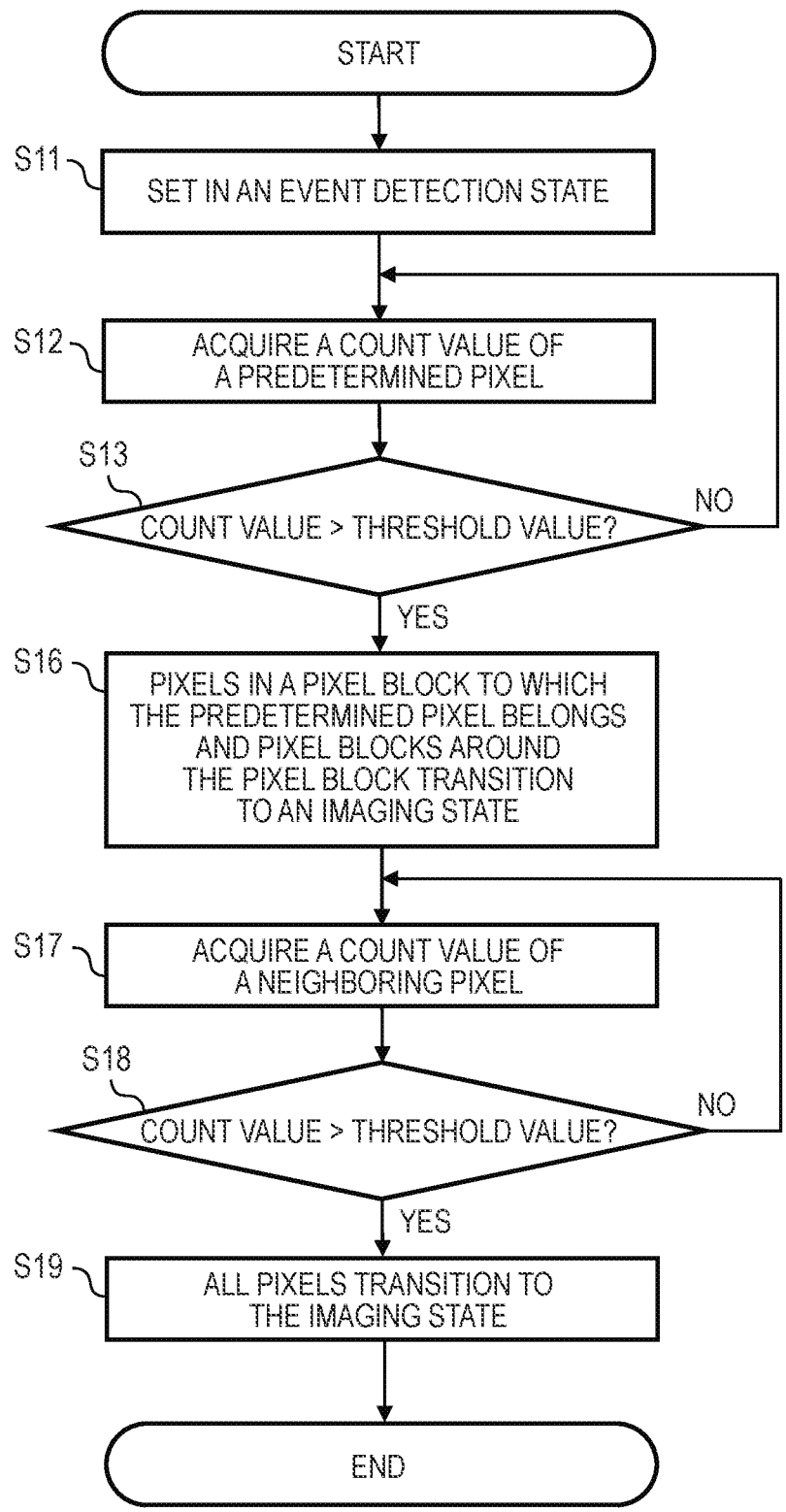
FIG. 26 is a flowchart illustrating a modified example of the driving method in the photoelectric conversion device according to the ninth embodiment of the present disclosure.

A photoelectric conversion device according to a ninth embodiment of the present disclosure will be described with reference to FIGS. 24 to 26. FIG. 24 is a schematic diagram illustrating an example of an arrangement of pixels and a driving method in the photoelectric conversion device according to the present embodiment. FIG. 25 is a flowchart illustrating an example of a driving method in the photoelectric conversion device according to the present embodiment. FIG. 26 is a flowchart illustrating a modified example of the driving method in the photoelectric conversion device according to the present embodiment.

The photoelectric conversion device of the present embodiment is a configuration example relating to a process of transition from an event detection state to an imaging state after event detection. Since the disclosures of any one of the first to eighth embodiments can be applied to the other circuit configuration and driving method, description thereof will be omitted.

FIG. 24 schematically illustrates the arrangement of the pixels 12 in the pixel unit 10 and the presence or absence of a transition from the event detection state to the imaging state. The upper part of FIG. 24 illustrates an arrangement of the pixel blocks 10a in the pixel unit 10. The pixel block 10a is a pixel group including a plurality of pixels 12 within a predetermined range. The lower part of FIG. 24 illustrates an arrangement of a plurality of pixels 12 included in one pixel block 10a. A hatched box in one pixel block 10a in the lower part of FIG. 24 indicates that the determination result satisfies a predetermined condition (count value>threshold value) in the pixel 12, and that event detection is determined. In the pixel unit 10 illustrated in FIG. 24, a hatched box indicates that all the pixels 12 included in the pixel block 10a transitions to the imaging state.

A method of driving the pixels 12 at the time of event detection will be described with reference to FIG. 25. Since the operations of steps S11, S12, and S13 are similar to those of FIG. 7, the description thereof will be omitted. In step S16, all the pixels 12 included in a pixel block 10a to which the predetermined pixel at which the count value has been detected to exceed the threshold value belong and pixel blocks 10a around the pixel block 10a transition from the event detection state to the imaging state. As a result, as illustrated in FIG. 24, the pixel block 10a including the pixel 12 that satisfies a predetermined condition and the pixel blocks 10a adjacent thereto are driven so as to transition to the imaging state.

As described above, in the photoelectric conversion device 100 of the present embodiment, not only the pixel 12 that satisfy the predetermined condition but also the pixels 12 around this pixel 12 transition from the event detection state to the imaging state. In a situation in which a still object is monitored by the photoelectric conversion device 100 to detect a motion of the object, information in the vicinity of the object is important. On the other hand, information at a location away from the object is not very useful. Therefore, when there is a motion in the object, the information in the vicinity of the object may be sufficient. In the present embodiment, by transitioning the pixels around the pixels 12 whose event detection has been determined to the imaging state, it is possible to maintain the event detection state and a low power consumption state in the less useful region while transitioning the region useful for imaging as described above to the imaging state. Therefore, according to the present embodiment, it is possible to provide the photoelectric conversion device 100 in which both reduction of power consumption and acquisition of a signal with high accuracy are achieved.

FIG. 26 is a modified example of the driving method of FIG. 25. In FIG. 26, steps S17, S18, and S19 are added after the driving method of FIG. 25.

In step S17, a count value is acquired from any one of neighboring pixels 12 transitioned to the imaging state in step S16. The details of the count value acquisition operation are the same as those in step S12.

In step S18, the threshold determination unit 344 determines whether or not the count value acquired from the neighboring pixel exceeds a predetermined threshold value. When the count value exceeds the predetermined threshold value (YES in step S18), it is determined that an event is detected, and the process proceeds to step S19. When the count value does not exceed the predetermined threshold value (NO in step S18), it is determined that no event is detected, and the process returns to step S17.

In step S19, all the pixels 12 in the pixel unit 10 transition from the event detection state to the imaging state.

In an imaging environment such as a dark place where the number of incident photons is small, even if event detection is performed, this may be erroneous detection due to noise. If all the pixels transition to the imaging state in this state, power may be wasted when erroneous detection occurs. Therefore, in the present modified example, the event detection is performed by further using the information of the pixels around the pixels in which the event detection is performed, so that all the pixels transition to the imaging state after the determination of the event detection is performed with higher accuracy. Thus, the possibility of waste of power due to erroneous detection can be reduced.

Tenth Embodiment

Figure 27:
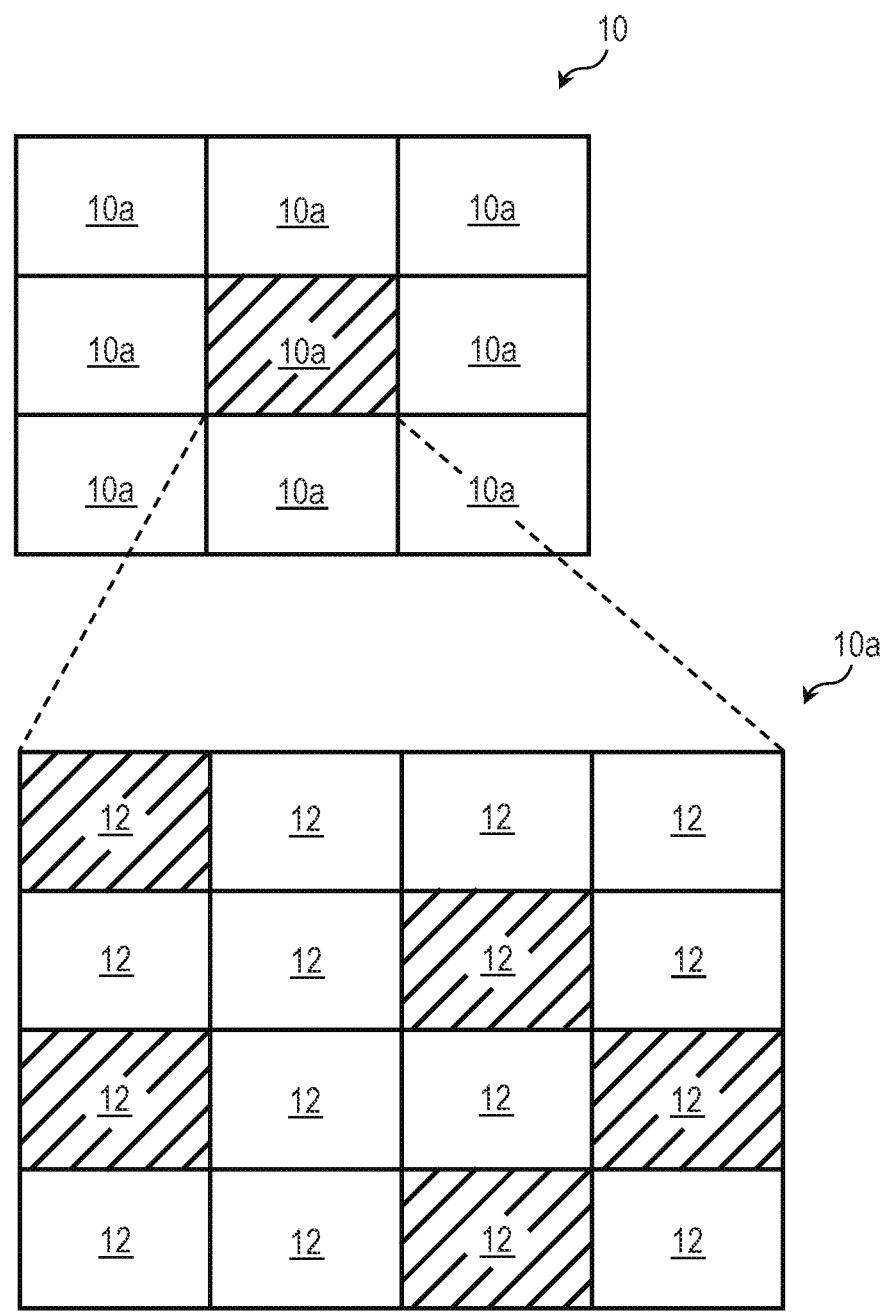
FIG. 27 is a schematic diagram illustrating an example of an arrangement of pixels and a driving method in the photoelectric conversion device according to a tenth embodiment of the present disclosure.
Figure 28:
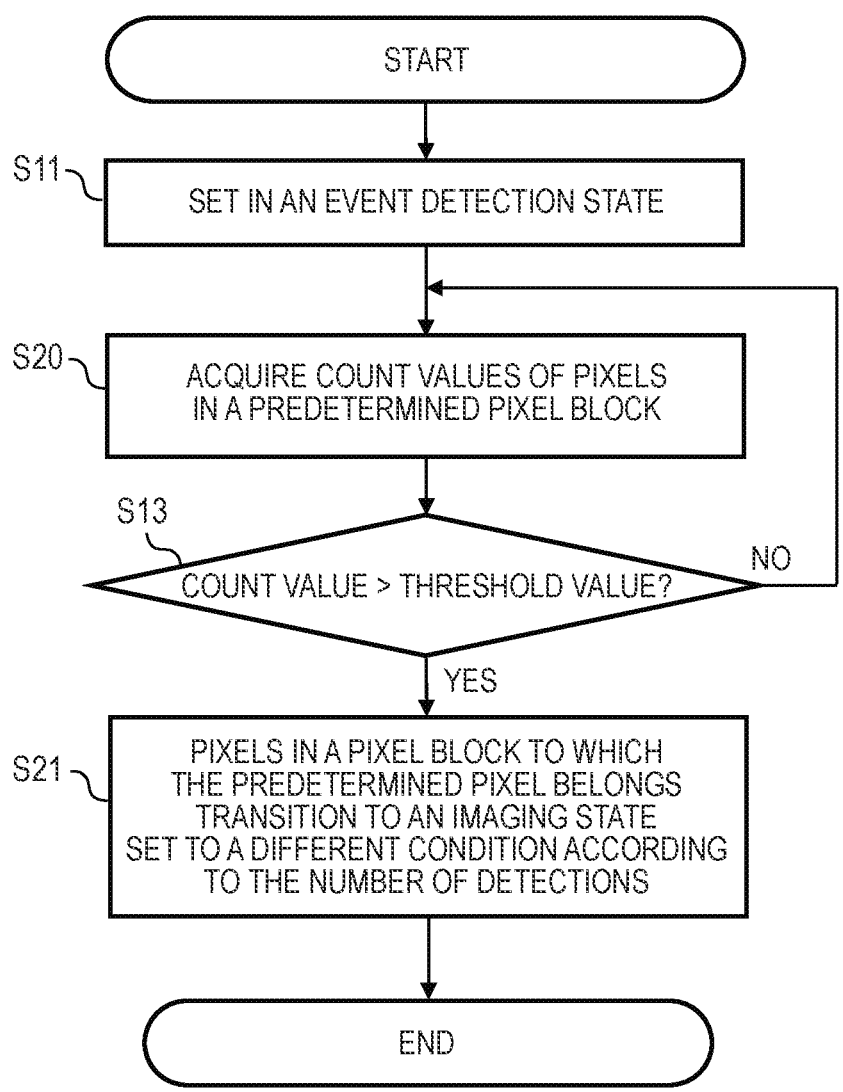
FIG. 28 is a flowchart illustrating an example of a driving method in the photoelectric conversion device according to the tenth embodiment of the present disclosure.

A photoelectric conversion device according to a tenth embodiment of the present disclosure will be described with reference to FIGS. 27 and 28. FIG. 27 is a schematic diagram illustrating an example of an arrangement of pixels and a driving method in the photoelectric conversion device according to the present embodiment. FIG. 28 is a flowchart illustrating an example of a driving method in the photoelectric conversion device according to the present embodiment.

The photoelectric conversion device of the present embodiment is a configuration example relating to processing of transition from an event detection state to an imaging state after event detection. Since the disclosures of any one of the first to ninth embodiments can be applied to the other circuit configuration and driving method, description thereof will be omitted.

FIG. 27 schematically illustrates the arrangement of the pixels 12 in the pixel unit 10 and the presence or absence of a transition from the event detection state to the imaging state. The arrangement and the like of the pixels 12 in the pixel unit 10 and the pixel block 10a are the same as those in FIG. 24. Each of the plurality of boxes which are hatched in one pixel block 10a, in the lower part of FIG. 27 indicates that the determination result satisfies a predetermined condition (count value>threshold value) in the pixel 12, and that the determination of event detection is made. In other words, in the example of FIG. 27, the event detection is determined at the five pixels 12. In the pixel unit 10 illustrated in FIG. 27, a hatched box indicates that all the pixels 12 included in the pixel block 10a transition to the imaging state.

A method of driving the pixels 12 at the time of event detection will be described with reference to FIG. 28. Since the operations of steps S11 and S13 are similar to that of FIG. 7, the description thereof will be omitted or simplified.

In step S20, count values are acquired from all the pixels 12 in the predetermined pixel block 10a. Then, in step S13, it is determined whether or not each count value exceeds a predetermined threshold value. The contents of the determination process for each count value are the same as those described in the first embodiment. When the count value output from at least one pixel 12 exceeds a predetermined threshold value (YES in step S13), it is determined that an event is detected, and the process proceeds to step S21. When the count value does not exceed the predetermined threshold value (NO in step S13), it is determined that no event is detected, and the process returns to step S20 to continue the event detection state.

In step S21, each pixel in the pixel block 10*a* in which the above-described count value acquisition and determination has been performed transitions to an imaging state set to a different condition according to the number of detections (five in the example of FIG. 27) of the pixels 12 that exceed the threshold value. In the configuration of the first embodiment, the "different condition" corresponds to changing the length of the period T2 according to the number of detections. In this case, it is preferable to shorten the period T2 to increase the frequency of output of the count value as the number of detections increases, thereby increasing the accuracy of the output signal. In the configuration of the second embodiment, the "different condition" corresponds to changing the length of the period T4 according to the number of detections. In this case, it is preferable to shorten the period T4 and shorten the period during which the count value is not output as the number of detections increases, thereby increasing the accuracy of the output signal. In the configuration of the third embodiment, the "different condition" corresponds to changing the frequency after the time t32 according to the detection number. In this case, it is preferable to increase the frequency of the recharging operation by setting the frequency after the time t32 to a higher frequency as the number of detections increases. In the configuration of the fourth embodiment, the "different condition" corresponds to changing at least one of the frequency and the frame rate after the time t16 or the time t26 according to the detection number. In this case, it is preferable to increase the accuracy by setting at least one of the frequency and the frame rate after the time t16 or the time t26 to be higher as the number of detections increases, and increasing the frequency of the output of the signal. In the configuration of the fifth embodiment, the "different condition" corresponds to changing at least one of the frequency and the number of bits after the time t36 according to the number of detections. In this case, it is preferable to set the frequency after the time t36 to be higher as the number of detections increases, or to set the number of bits after the time t36 to be greater as the number of detections increases, thereby increasing the accuracy of the output signal.

As described above, in the photoelectric conversion device 100 of the present embodiment, the state of the pixels 12 transitions to the imaging state set to a different condition according to the number of detections in the pixel block 10*a*. A region in which the number of detections is large often requires imaging under conditions different from other regions, such as a location where a large number of persons are gathered. Therefore, it is desirable that the imaging state after the transition be set to a different condition according to the detection number. According to the present embodiment, the photoelectric conversion device 100 capable of obtaining signals under more appropriate conditions is provided.

Further, as described above, it is more desirable that the greater the number of detections, the higher the accuracy in imaging state after transition. This example is more effective in an imaging environment in which high accuracy in a specific portion is required, such as face recognition.

Eleventh Embodiment

Figure 29:
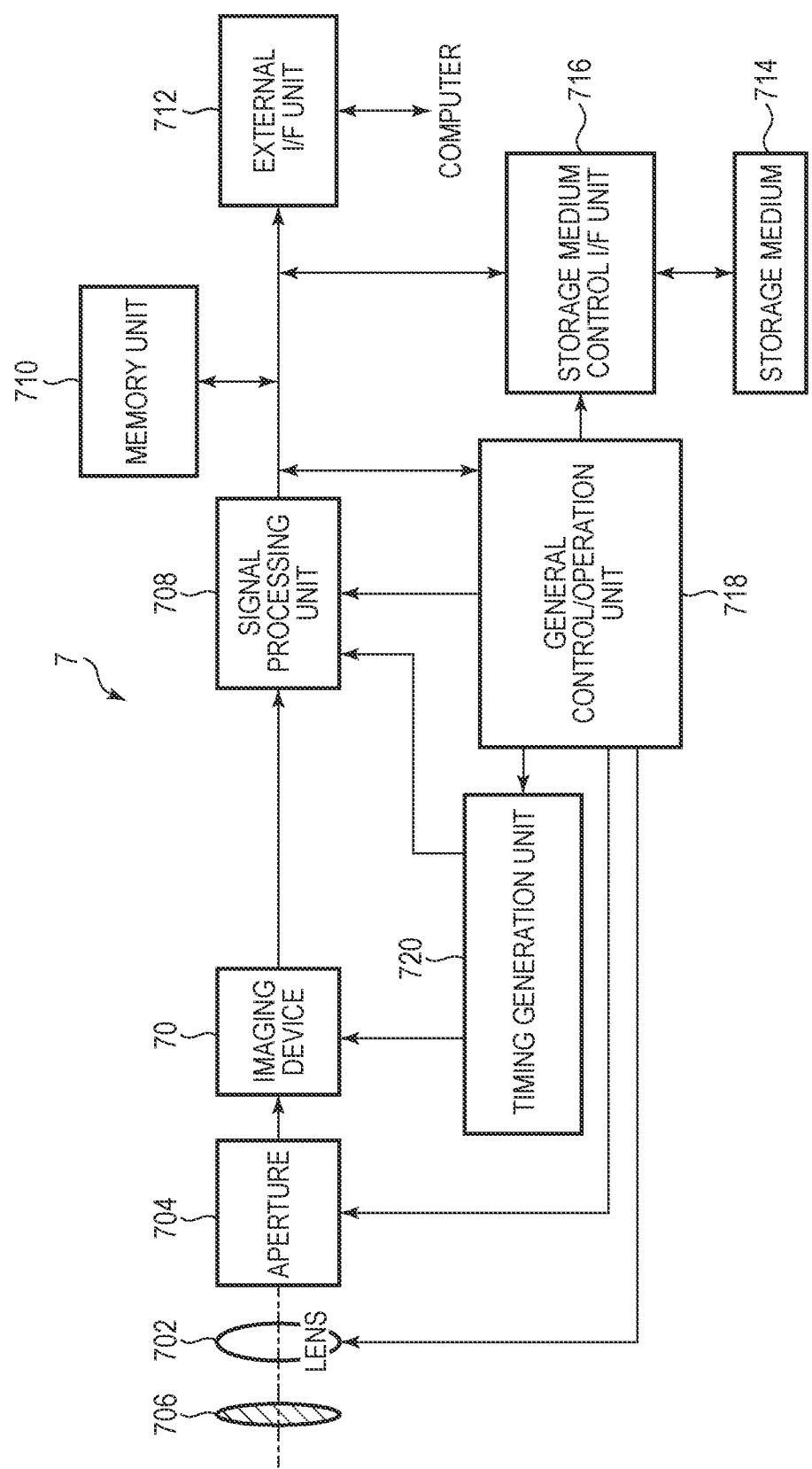
FIG. 29 is a block diagram illustrating a schematic configuration of a photodetection system according to an eleventh embodiment of the present disclosure.

A photodetection system according to an eleventh embodiment of the present disclosure will be described with reference to FIG. 29. FIG. 29 is a block diagram of a photodetection system according to the present embodiment. The photodetection system of the present embodiment is an imaging system that acquires an image based on incident light.

The photoelectric conversion device of the above-described embodiment may be applied to various imaging systems. Examples of the imaging system include a digital still camera, a digital camcorder, a camera head, a copying machine, a facsimile, a mobile phone, a vehicle-mounted camera, an observation satellite, and a surveillance camera. FIG. 29 is a block diagram of a digital still camera as an example of an imaging system.

The imaging system 7 illustrated in FIG. 29 includes a barrier 706, a lens 702, an aperture 704, an imaging device 70, a signal processing unit 708, a timing generation unit 720, a general control/operation unit 718, a memory unit 710, a storage medium control I/F unit 716, a storage medium 714, and an external I/F unit 712. The barrier 706 protects the lens, and the lens 702 forms an optical image of an object on the imaging device 70. The aperture 704 varies an amount of light passing through the lens 702. The imaging device 70 is configured as in the photoelectric conversion device of the above-described embodiment, and converts an optical image formed by the lens 702 into image data. The signal processing unit 708 performs various kinds of correction, data compression, and the like on the imaging data output from the imaging device 70.

The timing generation unit 720 outputs various timing signals to the imaging device 70 and the signal processing unit 708. The general control/operation unit 718 controls the entire digital still camera, and the memory unit 710 temporarily stores image data. The storage medium control I/F unit 716 is an interface for storing or reading out image data on the storage medium 714, and the storage medium 714 is a detachable storage medium such as a semiconductor memory for storing or reading out image data. The external I/F unit 712 is an interface for communicating with an external computer or the like. The timing signal or the like may be input from the outside of the imaging system 7, and the imaging system 7 may include at least the imaging device 70 and the signal processing unit 708 that processes an image signal output from the imaging device 70.

In the present embodiment, the imaging device 70 and the signal processing unit 708 may be arranged in the same semiconductor substrate. Further, the imaging device 70 and the signal processing unit 708 may be arranged in different semiconductor substrates.

Further, each pixel of the imaging device 70 may include a first photoelectric conversion unit and a second photoelectric conversion unit. The signal processing unit 708 processes a pixel signal based on a charge generated in the first photoelectric conversion unit and a pixel signal based on a charge generated in the second photoelectric conversion unit, and acquires the distance information from the imaging device 70 to the object.

Twelfth Embodiment

Figure 30:
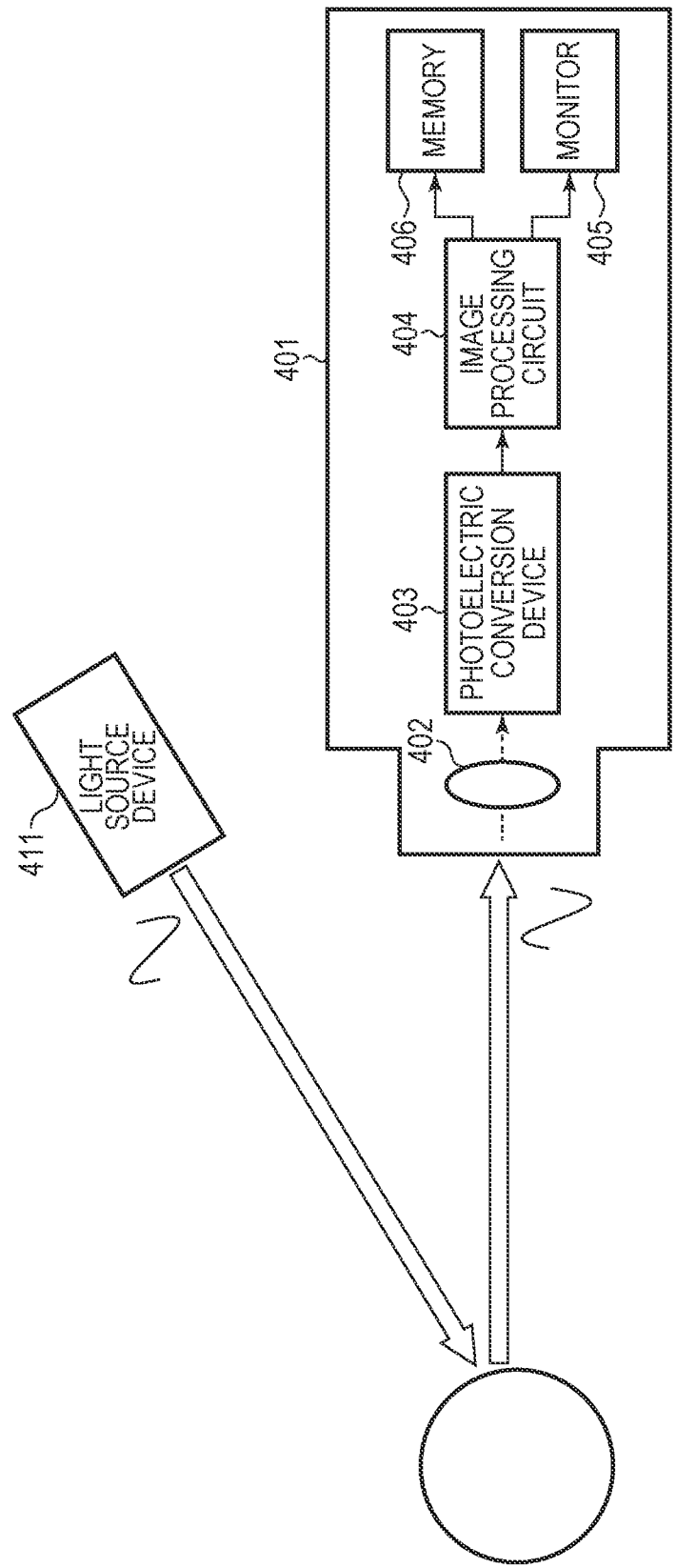
FIG. 30 is a block diagram illustrating a schematic configuration of a distance image sensor according to a twelfth embodiment of the present disclosure.

FIG. 30 is a block diagram of a photodetection system according to the present embodiment. More specifically, FIG. 30 is a block diagram of a distance image sensor using the photoelectric conversion device described in the above embodiment.

As illustrated in FIG. 30, the distance image sensor 401 includes an optical system 402, a photoelectric conversion device 403, an image processing circuit 404, a monitor 405, and a memory 406. The distance image sensor 401 receives light (modulated light or pulse light) emitted from the light source device 411 toward an object and reflected by the surface of the object. The distance image sensor 401 can acquire a distance image corresponding to a distance to the object based on a time period from light emission to light reception.

The optical system 402 includes one or a plurality of lenses, and guides image light (incident light) from the object to the photoelectric conversion device 403 to form an image on a light receiving surface (sensor unit) of the photoelectric conversion device 403.

As the photoelectric conversion device 403, the photoelectric conversion device of each of the embodiments described above can be applied. The photoelectric conversion device 403 supplies a distance signal indicating a distance obtained from the received light signal to the image processing circuit 404.

The image processing circuit 404 performs image processing for constructing a distance image based on the distance signal supplied from the photoelectric conversion device 403. The distance image (image data) obtained by the image processing can be displayed on the monitor 405 and stored (recorded) in the memory 406.

The distance image sensor 401 configured in this manner can acquire an accurate distance image by applying the photoelectric conversion device described above.

Thirteenth Embodiment

The technology according to the present disclosure can be applied to various products. For example, the technology according to the present disclosure may be applied to an endoscopic surgical system, which is an example of a photodetection system.

Figure 31:
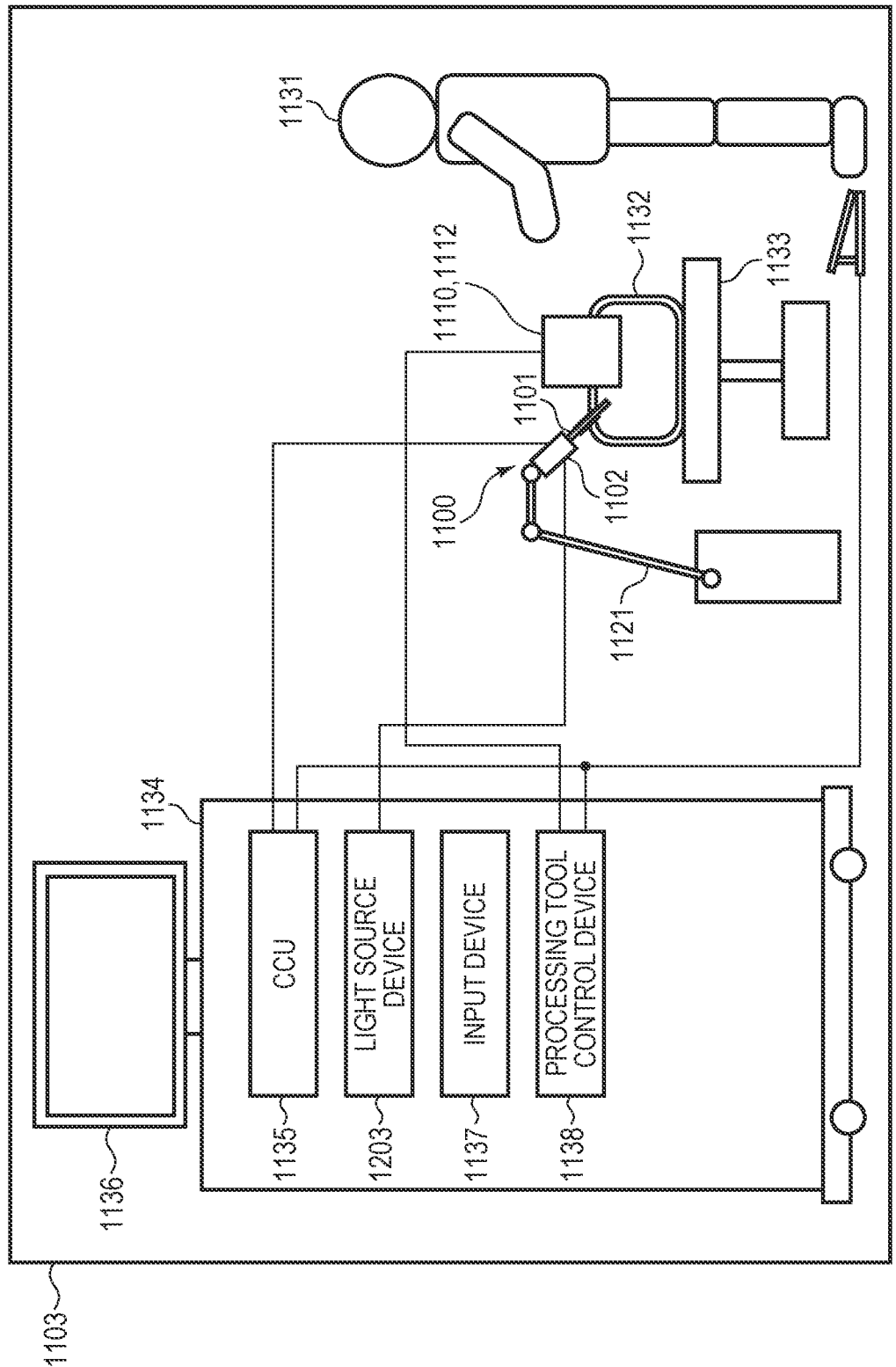
FIG. 31 is a schematic diagram illustrating a configuration example of an endoscopic surgical system according to a thirteenth embodiment of the present disclosure.

FIG. 31 is a schematic diagram of an endoscopic surgical system according to the present embodiment. FIG. 31 illustrates a state in which an operator (physician) 1131 performs surgery on a patient 1132 on a patient bed 1133 using an endoscopic surgical system 1103. As illustrated, the endoscopic surgical system 1103 includes an endoscope 1100, a surgical tool 1110, an arm 1121, and a cart 1134 on which various devices for endoscopic surgery are mounted.

The endoscope 1100 includes a barrel 1101 in which an area of a predetermined length from the distal end is inserted into a body cavity of a patient 1132, and a camera head 1102 connected to a proximal end of the barrel 1101. FIG. 31 illustrates an endoscope 1100 configured as a rigid scope having a rigid barrel 1101, but the endoscope 1100 may be configured as a flexible scope having a flexible barrel.

An opening into which an objective lens is fitted is provided at the distal end of the barrel 1101. A light source device 1203 is connected to the endoscope 1100. Light generated by the light source device 1203 is guided to the distal end of the barrel 1101 by a light guide extended inside the barrel 1101, and is irradiated to an observation target in the body cavity of the patient 1132 via an objective lens. The endoscope 1100 may be a straight-viewing scope an oblique-viewing scope, or a side-viewing scope.

An optical system and a photoelectric conversion device are provided inside the camera head 1102, and reflected light (observation light) from the observation target is focused on the photoelectric conversion device by the optical system. The observation light is photoelectrically converted by the photoelectric conversion device, and an electric signal corresponding to the observation light, that is, an image signal corresponding to an observation image is generated. As the photoelectric conversion device, the photoelectric conversion device described in each of the above embodiments can be used. The image signal is transmitted to a camera control unit (CCU) 1135 as RAW data.

The CCU 1135 includes a central processing unit (CPU), a graphics processing unit (GPU), and the like, and integrally controls operations of the endoscope 1100 and a display device 1136. Further, the CCU 1135 receives an image signal from the camera head 1102, and performs various types of image processing for displaying an image based on the image signal, such as development processing (demosaic processing).

The display device 1136 displays an image based on the image signal processed by the CCU 1135 under the control of the CCU 1135.

The light source device 1203 includes, for example, a light source such as a light emitting diode (LED), and supplies irradiation light to the endoscope 1100 when capturing an image of a surgical site or the like.

An input device 1137 is an input interface for the endoscopic surgical system 1103. The user can input various types of information and instructions to the endoscopic surgical system 1103 via the input device 1137.

A processing tool control device 1138 controls the actuation of the energy treatment tool 1112 for ablation of tissue, incision, sealing of blood vessels, and the like.

The light source device 1203 can supply irradiation light to the endoscope 1100 when capturing an image of a surgical site, and may be, for example, a white light source such as an LED, a laser light source, or a combination thereof. When a white light source is constituted by a combination of RGB laser light sources, the output intensity and output timing of each color (each wavelength) can be controlled with high accuracy. Therefore, the white balance of the captured image can be adjusted in the light source device 1203. In this case, laser light from each of the RGB laser light sources may be irradiated onto the observation target in a time-division manner, and driving of the imaging element of the camera head 1102 may be controlled in synchronization with the irradiation timing. Thus, images corresponding to R, G, and B can be captured in a time-division manner. According to such a method, a color image can be obtained without providing a color filter in the imaging element.

Further, the driving of the light source device 1203 may be controlled so that the intensity of the light output from the light source device 1203 is changed at predetermined time intervals. By controlling the driving of the imaging element of the camera head 1102 in synchronization with the timing of changing the intensity of light to acquire images in a time-division manner, and by synthesizing the images, it is possible to generate an image in a high dynamic range without so-called black out and white out.

Further, the light source device 1203 may be configured to be capable of supplying light in a predetermined wavelength band corresponding to special light observation. In the special light observation, for example, wavelength dependency of absorption of light in body tissue can be utilized. Specifically, predetermined tissues such as blood vessels in the surface layer of the mucosa are photographed with high contrast by irradiating light in a narrower band compared to the irradiation light (that is, white light) during normal observation. Alternatively, in the special light observation, fluorescence observation for obtaining an image by fluorescence generated by irradiation with excitation light may be performed. In the fluorescence observation, the body tissue can be irradiated with excitation light to observe fluorescence from the body tissue, or a reagent such as indocyanine green (ICG) can be locally injected to the body tissue and the body tissue can be irradiated with excitation light corresponding to the fluorescence wavelength of the reagent to obtain a fluorescence image. The light source device 1203 may be configured to supply narrowband light and/or excitation light corresponding to such special light observation.

Fourteenth Embodiment

A photodetection system and A movable body of the present embodiment will be described with reference to FIGS. 32, 33A, 33B, 33C, and 34. In the present embodiment, an example of an in-vehicle camera is illustrated as a photodetection system.

Figure 32:
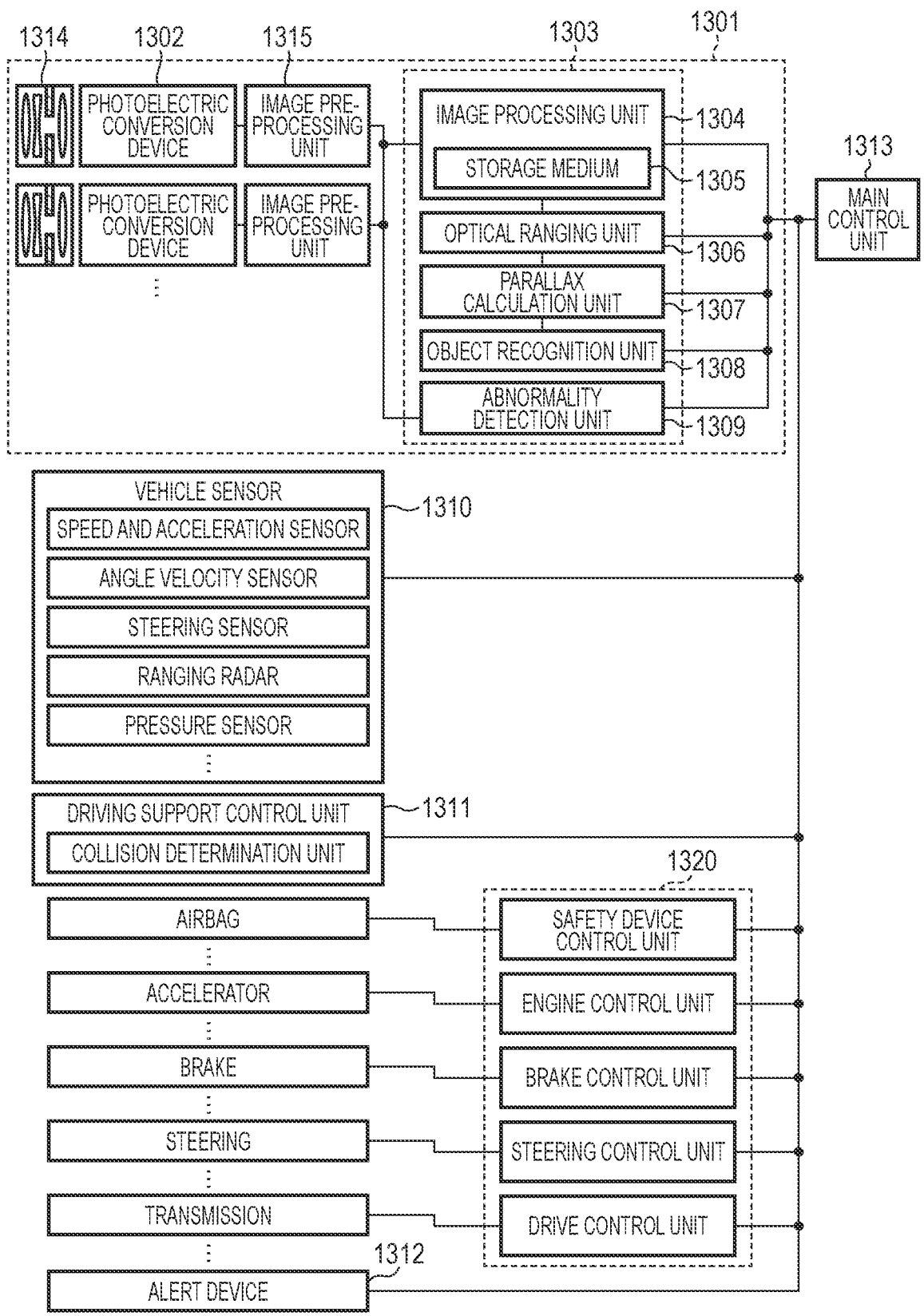
FIG. 32 is a schematic diagram illustrating a configuration example of a movable body according to a fourteenth embodiment of the present disclosure.

FIG. 32 is a schematic diagram of a photodetection system according to the present embodiment, and illustrates an example of a vehicle system and a photodetection system mounted on the vehicle system. The photodetection system 1301 includes photoelectric conversion devices 1302, image pre-processing units 1315, an integrated circuit 1303, and optical systems 1314. The optical system 1314 forms an optical image of an object on the photoelectric conversion device 1302. The photoelectric conversion device 1302 converts the optical image of the object formed by the optical system 1314 into an electric signal. The photoelectric conversion device 1302 is the photoelectric conversion device of any one of the above-described embodiments. The image pre-processing unit 1315 performs predetermined signal processing on the signal output from the photoelectric conversion device 1302. The function of the image pre-processing unit 1315 may be incorporated in the photoelectric conversion device 1302. The photodetection system 1301 is provided with at least two sets of the optical system 1314, the photoelectric conversion device 1302, and the image pre-processing unit 1315, and an output signal from the image pre-processing units 1315 of each set is input to the integrated circuit 1303.

The integrated circuit 1303 is an integrated circuit for use in an imaging system, and includes an image processing unit 1304 including a storage medium 1305, an optical ranging unit 1306, a parallax calculation unit 1307, an object recognition unit 1308, and an abnormality detection unit 1309. The image processing unit 1304 performs image processing such as development processing and defect correction on the output signal of the image pre-processing unit 1315. The storage medium 1305 performs primary storage of captured images and stores defect positions of image capturing pixels. The optical ranging unit 1306 focuses or measures the object. The parallax calculation unit 1307 calculates distance measurement information (distance information) from the plurality of image data (parallax image) acquired by the plurality of photoelectric conversion devices 1302. The object recognition unit 1308 recognizes an object such as a car, a road, a sign, or a person. When the abnormality detection unit 1309 detects the abnormality of the photoelectric conversion device 1302, the abnormality detection unit 1309 issues an abnormality to the main control unit 1313.

The integrated circuit 1303 may be realized by dedicated hardware, a software module, or a combination thereof. It may be realized by a field programmable gate array (FPGA), an application specific integrated circuit (ASIC), or the like, or may be realized by a combination of these.

The main control unit 1313 controls overall operations of the photodetection system 1301, a vehicle sensor 1310, a control unit 1320, and the like. Without the main control unit 1313, the photodetection system 1301, the vehicle sensor 1310, and the control remit 1320 may individually have a communication interface, and each of them may transmit and receive control signals via a communication network, for example, according to the CAN standard.

The integrated circuit 1303 has a function of transmitting a control signal or a setting value to the photoelectric conversion device 1302 by receiving a control signal from the main control unit 1313 or by its own control unit.

The photodetection system 1301 is connected to the vehicle sensor 1310, and can detect a traveling state of the host vehicle such as a vehicle speed, a yaw rate, a steering angle, and the like, an environment outside the host vehicle, and states of other vehicles and obstacles. The vehicle sensor 1310 is also a distance information acquisition unit that acquires distance information to the object. The photodetection system 1301 is connected to a driving support control unit 1311 that performs various driving support functions such as an automatic steering function, an automatic cruise function, and a collision prevention function. In particular, with regard to the collision determination function, based on detection results of the photodetection system 1301 and the vehicle sensor 1310, it is determined whether or not there is a possibility or occurrence of collision with another vehicle or an obstacle. Thus, avoidance control is performed when a possibility of collision is estimated and a safety device is activated when collision occurs.

The photodetection system 1301 is also connected to an alert device 1312 that issues an alarm to a driver based on a determination result of the collision determination unit. For example, when the possibility of collision is high as the determination result of the collision determination unit, the main control unit 1313 performs vehicle control such as braking, returning an accelerator, suppressing engine output, or the like, thereby avoiding collision or reducing damage. The alert device 1312 issues a warning to a user using means such as an alarm of a sound or the like, a display of alarm information on a display unit screen such as a car navigation system and a meter panel, and a vibration application to a seatbelt and a steering wheel.

Figure 33A:
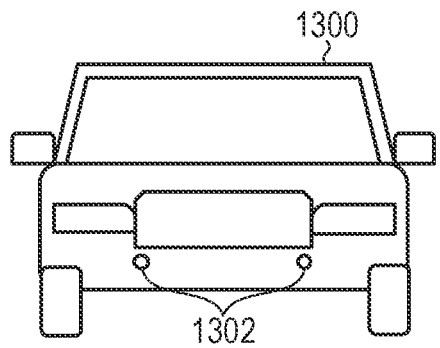
FIGS. 33A, 33B, and 33C are block diagrams illustrating a schematic configuration of a photodetection system according to the fourteenth embodiment of the present disclosure.
Figure 33B:
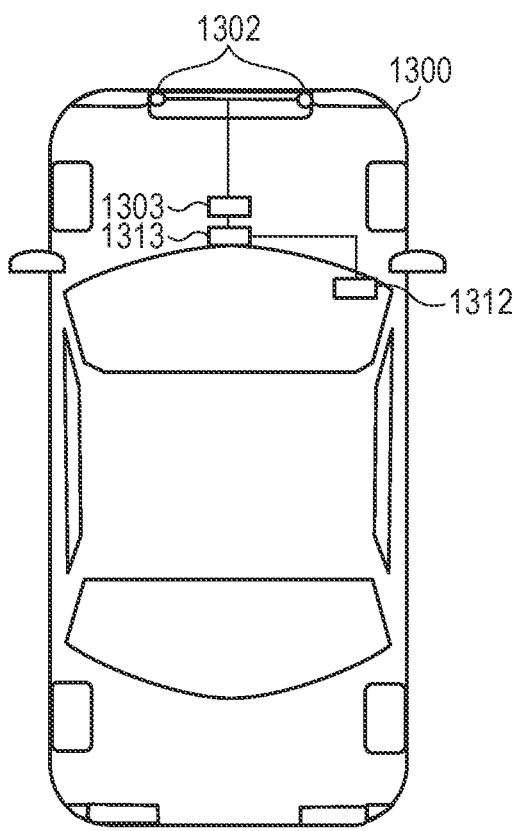
Figure 33C:
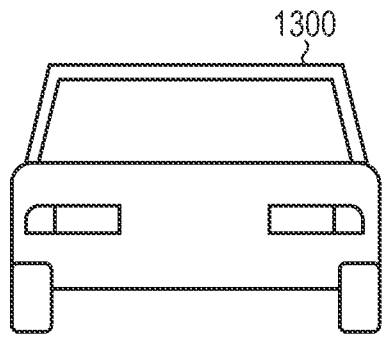

The photodetection system 1301 according to the present embodiment can capture an image around the vehicle, for example, the front or the rear. FIGS. 33A, 33B, and 33C are schematic diagrams of a movable body according to the present embodiment, and illustrate a configuration in which an image of the front of the vehicle is captured by the photodetection system 1301.

The two photoelectric conversion devices 1302 are arranged in front of the vehicle 1300. Specifically, it is preferable that a center line with respect to a forward/backward direction or an outer shape (for example, a vehicle width) of the vehicle 1300 be regarded as a symmetry axis, and two photoelectric conversion devices 1302 be arranged in line symmetry with respect to the symmetry axis. This makes it possible to effectively acquire distance information between the vehicle 1300 and the object to be imaged and determine the possibility of collision. Further, it is preferable that the photoelectric conversion device 1302 be arranged at a position where it does not obstruct the field of view of the driver when the driver sees a situation outside the vehicle 1300 from the driver's seat. The alert device 1312 is preferably arranged at a position that is easy to enter the field of view of the driver.

Figure 34:
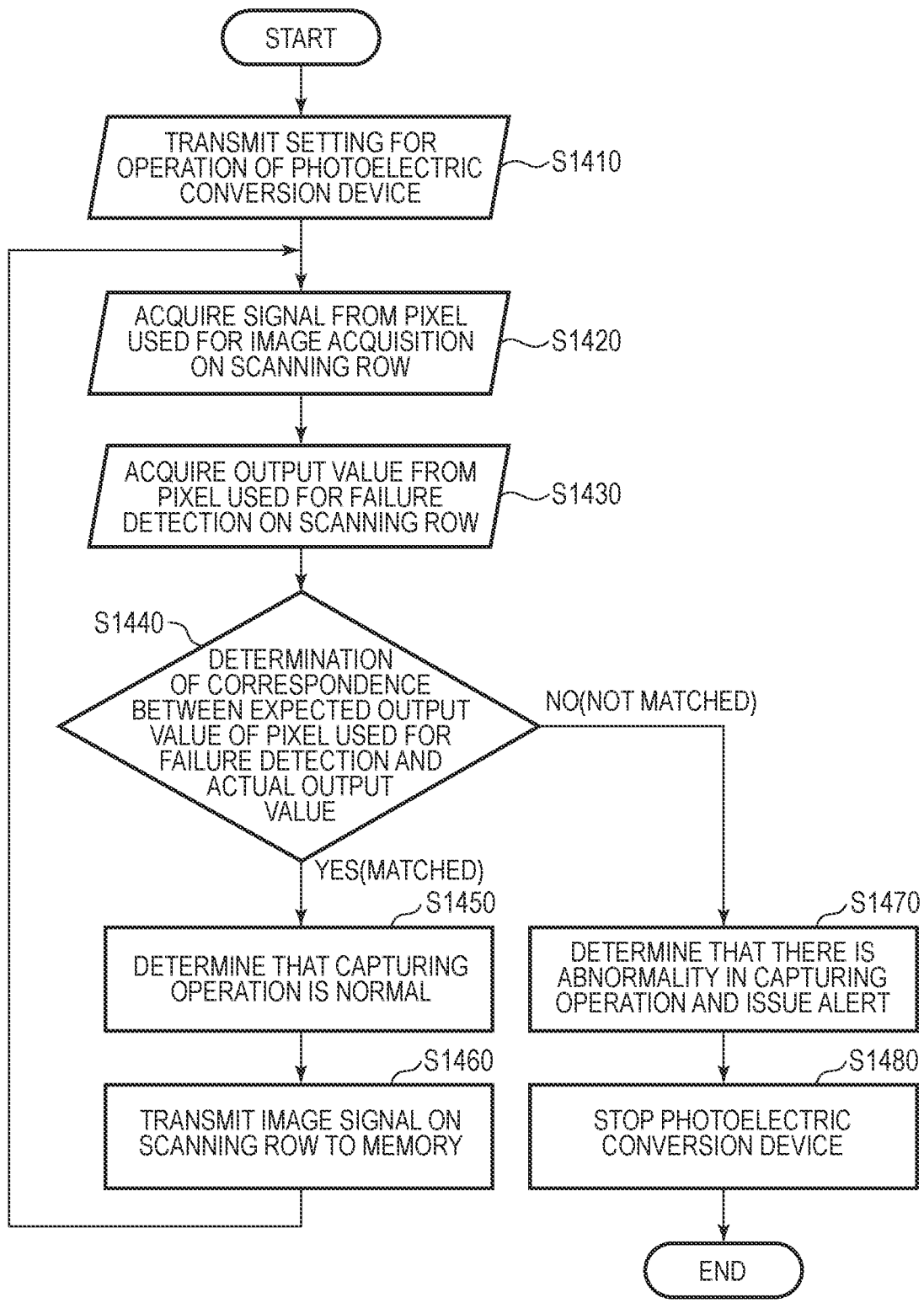
FIG. 34 is a flowchart illustrating an operation of the photodetection system according to the fourteenth embodiment of the present disclosure.

Next, a failure detection operation of the photoelectric conversion device 1302 in the photodetection system 1301 will be described with reference to FIG. 34. FIG. 34 is a flowchart illustrating an operation of the photodetection system according to the present embodiment. The failure detection operation of the photoelectric conversion device 1302 may be performed according to steps S1410 to S1480 illustrated in FIG. 34.

In step S1410, the setting at the time of startup of the photoelectric conversion device 1302 is performed. That is, setting information for the operation of the photoelectric conversion device 1302 is transmitted from the outside of the photodetection system 1301 (for example, the main control unit 1313) or the inside of the photodetection system 1301, and the photoelectric conversion device 1302 starts an imaging operation and a failure detection operation.

Next, in step S1420, the photoelectric conversion device 1302 acquires pixel signals from the effective pixels. In step S1430, the photoelectric conversion device 1302 acquires an output value from a failure detection pixel provided for failure detection. The failure detection pixel includes a photoelectric conversion element in the same manner as the effective pixel. A predetermined voltage is written to the photoelectric conversion element. The failure detection pixel outputs a signal corresponding to the voltage written in the photoelectric conversion element. Steps S1420 and S1430 may be executed in reverse order.

Next, in step S1440, the photodetection system 1301 performs a determination of correspondence between the expected output value of the failure detection pixel and the actual output value from the failure detection pixel. If it is determined in step S1440 that the expected output value matches the actual output value, the photodetection system 1301 proceeds with the process to step S1450, determines that the imaging operation is normally performed, and proceeds with the process to step S1460. In step S1460, the photodetection system 1301 transmits the pixel signals of the scanning row to the storage medium 1305 and temporarily stores them. Thereafter, the process of the photodetection system 1301 returns to step S1420 to continue the failure detection operation. On the other hand, as a result of the determination in step S1440, if the expected output value does not match the actual output value, the photodetection system 1301 proceeds with the process to step S1470. In step S1470, the photodetection system 1301 determines that there is an abnormality in the imaging operation, and issues an alert to the main control unit 1313 or the alert device 1312. The alert device 1312 causes the display unit to display that an abnormality has been detected. Then, in step S1480, the photodetection system 1301 stops the photoelectric conversion device 1302 and ends the operation of the photodetection system 1301.

Although the present embodiment exemplifies the example in which the flowchart is looped for each row, the flowchart may be looped for each plurality of rows, or the failure detection operation may be performed for each frame. The alert of step S1470 may be notified to the outside of the vehicle via a wireless network.

Further, in the present embodiment, the control in which the vehicle does not collide with another vehicle has been described, but the present embodiment is also applicable to a control in which the vehicle is automatically driven following another vehicle, a control in which the vehicle is automatically driven so as not to protrude from the lane, and the like. Further, the photodetection system 1301 can be applied not only to a vehicle such as a host vehicle, but also to a movable body (movable apparatus) such as a ship, an aircraft, or an industrial robot. In addition, the present embodiment can be applied not only to a movable body but also to an apparatus utilizing object recognition such as an intelligent transport systems (ITS).

The photoelectric conversion device of the present disclosure may be a configuration capable of further acquiring various types of information such as distance information.

Fifteenth Embodiment

Figure 35A:
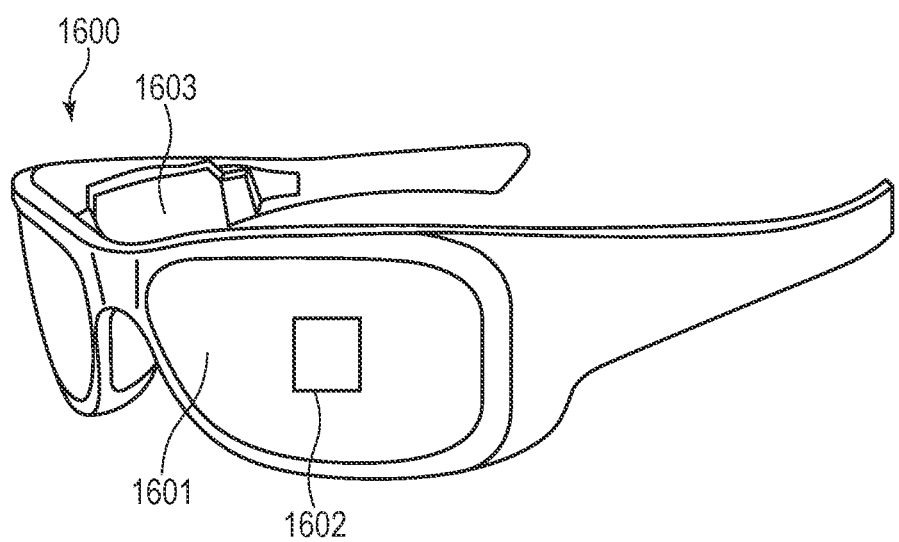
FIGS. 35A and 35B are schematic diagrams illustrating a schematic configuration of a photodetection system according to a fifteenth embodiment of the present disclosure.

FIG. 35A is a diagram illustrating a specific example of an electronic device according to the present embodiment, and illustrates glasses 1600 (smart glasses). The glasses 1600 are provided with the photoelectric conversion device 1602 described in the above embodiments. That is, the glasses 1600 are an example of a photodetection system to which the photoelectric conversion device 1602 described in each of the above embodiments can be applied. A display device including a light emitting device such as an OLED or an LED may be provided on the back surface side of the lens 1601. One photoelectric conversion device 1602 or a plurality of photoelectric conversion devices 1602 may be provided. Further, a plurality of types of photoelectric conversion devices may be combined. The arrangement position of the photoelectric conversion device 1602 is not limited to that illustrated in FIG. 35A.

The glasses 1600 further comprise a control device 1603. The control device 1603 functions as a power source for supplying power to the photoelectric conversion device 1602 and the above-described display device. The control device 1603 controls operations of the photoelectric conversion device 1602 and the display device. The lens 1601 is provided with an optical system for collecting light to the photoelectric conversion device 1602.

Figure 35B:
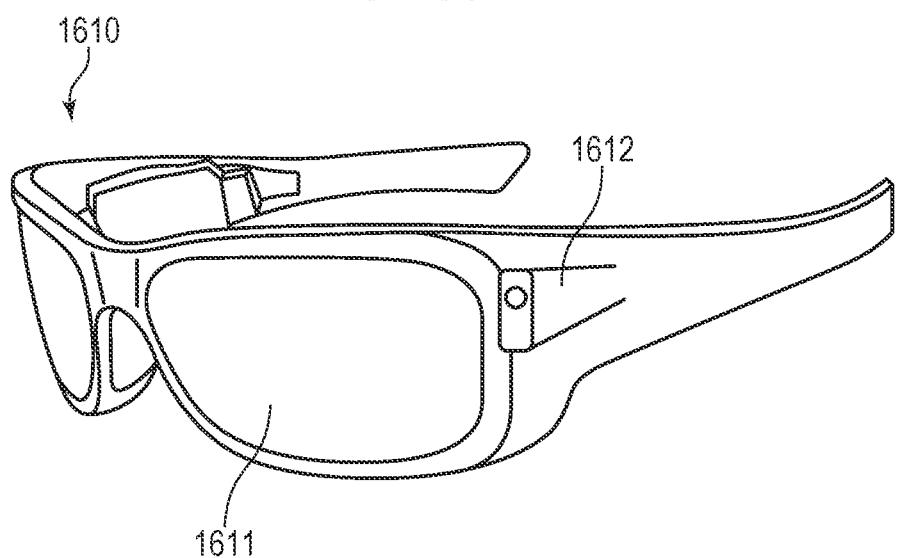

FIG. 35B illustrates glasses 1610 (smart glasses) according to one application. The glasses 1610 include a control device 1612, and a photoelectric conversion device corresponding to the photoelectric conversion device 1602 and a display device are mounted on the control device 1612. The lens 1611 is provided with a photoelectric conversion device in the control device 1612 and an optical system for projecting light emitted from a display device, and an image is projected on the lens 1611. The control device 1612 functions as a power source for supplying power to the photoelectric conversion device and the display device, and controls operations of the photoelectric conversion device and the display device. The control device 1612 may include a line-of-sight detection unit that detects the line of sight of the wearer. Infrared radiation may be used to detect the line of sight. The infrared light emitting unit emits infrared light to the eyeball of the user who is watching the display image. The reflected light of the emitted infrared light from the eyeball is detected by an imaging unit having a light receiving element, whereby a captured image of the eyeball is obtained. A reduction unit that reduces light from the infrared light emitting unit to the display unit in a plan view may be employed and the reduction unit reduces a degradation in image quality.

The control device 1612 detects the line of sight of the user with respect to the display image from the captured image of the eyeball obtained by imaging the infrared light. Any known method can be applied to the line-of-sight detection using the captured image of the eyeball. As an example, a line-of-sight detection method based on a Purkinje image due to reflection of irradiation light at a cornea can be used.

More specifically, a line-of-sight detection process based on a pupil cornea reflection method is performed. By using the pupil cornea reflection method, a line-of-sight vector representing a direction (rotation angle) of the eyeball is calculated based on the image of the pupil included in the captured image of the eyeball and the Purkinje image, whereby the line-of-sight of the user is detected.

The display device of the present embodiment may include a photoelectric conversion device having a light receiving element, and may control a display image of the display device based on line-of-sight information of the user from the photoelectric conversion device.

Specifically, the display device determines a first view field region gazed by the user and a second view field region other than the first view field region based on the line-of-sight information. The first view field region and the second view field region may be determined by a control device of the display device, or may be determined by an external control device. In the display area of the display device, the display resolution of the first view field region may be controlled to be higher than the display resolution of the second view field region. That is, the resolution of the second view field region may be lower than that of the first view field region.

The display area may include a first display region and a second display region different from the first display region. A region having a high priority may be determined from the first display region and the second display region based on the line-of-sight information. The first view field region and the second view field region may be determined by a control device of the display device, or may be determined by an external control device. The resolution of the high priority area may be controlled to be higher than the resolution of the region other than the high priority region. That is, the resolution of a region having a relatively low priority can be reduced.

It should be noted that an artificial intelligence (AI) may be used in determining the first view field region and the region with high priority. The AI may be a model configured to estimate an angle of a line of sight and a distance to a target on the line-of-sight from an image of an eyeball, and the AI may be trained using training data including images of an eyeball and an angle at which the eyeball in the images actually gazes. The AI program may be provided in either a display device or a photoelectric conversion device, or may be provided in an external device. When the external device has the AI program, the AI program may be transmitted from a server or the like to a display device via communication.

When the display control is performed based on the line-of-sight detection, the present embodiment can be preferably applied to a smart glasses which further includes a photoelectric conversion device for capturing an image of the outside. The smart glasses can display captured external information in real time.

Modified Embodiments

The present invention is not limited to the above embodiment, and various modifications are possible. For example, an example in which some of the configurations of any of the embodiments are added to other embodiments or an example in which some of the configurations of any of the embodiments are replaced with some of the configurations of other embodiments is also an embodiment of the present invention.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-000028, filed Jan. 1, 2022, and Japanese Patent Application No. 2022-000029, filed Jan. 1, 2022, which are hereby incorporated by reference herein in their entirety.

What is claimed is:

1. A photoelectric conversion device comprising a plurality of pixels, each of the plurality of pixels including:
   an avalanche photodiode; and
   a signal processing circuit including a counter configured to generate a count value based on a photon incident on the avalanche photodiode during a count period, the signal processing circuit being configured to output the count value for each count period repeatedly,
   wherein at least one pixel of the plurality of pixels transitions from a first state to a second state in which a length of the count period is shorter than that in the first state in accordance with a result of determination based on the count value and a predetermined threshold value, and
   wherein in accordance with a result of the determination in one pixel of the plurality of pixels, at least two pixels of the plurality of pixels transition to the second state.

2. The photoelectric conversion device according to claim 1, wherein a cycle of resetting the counter in the second state is shorter than a cycle of resetting the counter in the first state.

3. The photoelectric conversion device according to claim 1, wherein an interval between two count periods in the second state is shorter than an interval between two count periods in the first state.

4. The photoelectric conversion device according to claim 1,
wherein the pixel further includes a quenching transistor configured to return a state of the avalanche photodiode after an avalanche multiplication has occurred to a state in which the avalanche multiplication is enabled again, and a pulse generation unit configured to output a pulse signal whose level changes at a predetermined frequency to a gate of the quenching transistor, and
wherein the frequency in the second state is higher than the frequency in the first state.

5. The photoelectric conversion device according to claim 4, wherein a length of one of a high-level period and a low-level period of the pulse signal is the same between the first state and the second state.

6. The photoelectric conversion device according to claim 1, wherein the pixel transitions from the first state to the second state when the count value exceeds a predetermined threshold value.

7. The photoelectric conversion device according to claim 1, wherein the pixel transitions from the first state to the second state when a temporal change of the count value exceeds a predetermined threshold value.

8. The photoelectric conversion device according to claim 1, wherein the plurality of pixels is arranged to form a plurality of rows and a plurality of columns.

9. The photoelectric conversion device according to claim 8, wherein in the first state, all of the plurality of pixels perform the determination.

10. The photoelectric conversion device according to claim 8, wherein in the first state, the plurality of pixels sequentially performs the determination in an order corresponding to an arrangement of the plurality of pixels.

11. The photoelectric conversion device according to claim 8, wherein in the first state, the plurality of pixels sequentially performs the determination in a random order with respect to an arrangement of the plurality of pixels.

12. The photoelectric conversion device according to claim 8, wherein in the first state, a part of the plurality of pixels performs the determination, and another part of the plurality of pixels does not perform the determination.

13. The photoelectric conversion device according to claim 8, wherein in accordance with the result of the determination in the one pixel of the plurality of pixels, all of the plurality of pixels transition to the second state.

14. The photoelectric conversion device according to claim 8, wherein the at least two pixels includes the one pixel.

15. The photoelectric conversion device according to claim 14, wherein the at least two pixels of the plurality of pixels are adjacent to each other.

16. The photoelectric conversion device according to claim 8, wherein the one pixel is a part of a pixel block that is a part of the plurality of pixels and the pixel block includes a plurality of pixels, and in accordance with the result of the determination in the one pixel, all of the plurality of pixels belonging to the pixel block transition to the second state.

17. The photoelectric conversion device according to claim 16, wherein in accordance with the number of pixels in the pixel block in which a result of the determination satisfies a predetermined condition, a condition after the transition to the second state being performed is set.

18. A photodetection system comprising:
the photoelectric conversion device according to claim 1; and
a signal processing device configured to process a signal output from the photoelectric conversion device.

19. The photodetection system according to claim 18, wherein the signal processing device generates a distance image representing distance information to an object based on the signal.

20. A movable body comprising:
the photoelectric conversion device according to claim 1;
a distance information acquisition unit configured to acquire distance information to an object from a parallax image based on a signal output from the photoelectric conversion device; and
a control unit configured to control the movable body based on the distance information.

21. A photoelectric conversion device comprising a plurality of pixels, each of the plurality of pixels including:
an avalanche photodiode; and
a signal processing circuit including a counter configured to generate a count value based on a photon incident on the avalanche photodiode during a count period, the signal processing circuit being configured to output the count value for each count period repeatedly,
wherein at least one pixel of the plurality of pixels transitions from a first state to a second state in which an interval between two count periods is shorter than that in the first state in accordance with a result of determination based on the count value and a predetermined threshold value, and
wherein in accordance with a result of the determination in one pixel of the plurality of pixels, at least two pixels of the plurality of pixels transition to the second state.

22. The photoelectric conversion device according to claim 21,
wherein the pixel further includes a quenching transistor configured to return a state of the avalanche photodiode after an avalanche multiplication has occurred to a state in which the avalanche multiplication is enabled again, and
wherein a length of a period during which the quenching transistor is turned off in the second state is shorter than a length of a period during which the quenching transistor is turned off in the first state.

23. A photoelectric conversion device comprising a plurality of pixels, the plurality of pixels including:
an avalanche photodiode;
a signal processing circuit including a counter configured to generate a count value based on a photon incident on the avalanche photodiode during a count period, the signal processing circuit being configured to output the count value at a predetermined frame rate;
a quenching transistor configured to return a state of the avalanche photodiode after an avalanche multiplication has occurred to a state in which the avalanche multiplication is enabled again; and
a pulse generation unit configured to output a pulse signal whose level changes at a predetermined frequency to a gate of the quenching transistor,
wherein at least one pixel of the plurality of pixels transitions from a first state to a second state in which the frequency and the frame rate are higher than those in the first state in accordance with a result of determination based on the count value and a predetermined threshold value, and wherein in accordance with a result of the determination in one pixel of the plurality of pixels, at least two pixels of the plurality of pixels transition to the second state.

24. The photoelectric conversion device according to claim 23, wherein the number of bits of the count value in the second state is greater than the number of bits of the count value in the first state.

25. The photoelectric conversion device according to claim 24, wherein the count value in the first state does not include a least significant bit of the count value in the second state.

26. The photoelectric conversion device according to claim 23, wherein a length of one of a high-level period and a low level period of the pulse signal is the same between the first state and the second state.

27. The photoelectric conversion device according to claim 23, wherein the pixel transitions from the first state to the second state when the count value exceeds a predetermined threshold value.

28. The photoelectric conversion device according to claim 23, wherein the pixel transitions from the first state to the second state when a temporal change of the count value exceeds a predetermined threshold value.

29. The photoelectric conversion device according to claim 23, wherein the plurality of pixels is arranged to form a plurality of rows and a plurality of columns.

30. The photoelectric conversion device according to claim 29, wherein in the first state, all of the plurality of pixels perform the determination.

31. The photoelectric conversion device according to claim 29, wherein in the first state, the plurality of pixels sequentially performs the determination in an order corresponding to an arrangement of the plurality of pixels.

32. The photoelectric conversion device according to claim 29, wherein in the first state, the plurality of pixels sequentially performs the determination in a random order with respect to an arrangement of the plurality of pixels.

33. The photoelectric conversion device according to claim 29, wherein in the first state, a part of the plurality of pixels performs the determination, and another part of the plurality of pixels does not perform the determination.

34. The photoelectric conversion device according to claim 29, wherein in accordance with the result of the determination in one pixel of the plurality of pixels, all of the plurality of pixels transition to the second state.

35. The photoelectric conversion device according to claim 29, wherein the at least two pixels includes the one pixel.

36. The photoelectric conversion device according to claim 35, wherein the two pixels of the plurality of pixels are adjacent to each other.

37. The photoelectric conversion device according to claim 29, wherein the one pixel is a part of a pixel block that is a part of the plurality of pixels and the pixel block includes a plurality of pixels, and in accordance with the result of the determination in the one pixel, all of the plurality of pixels belonging to the pixel block transition to the second state.

38. The photoelectric conversion device according to claim 37, wherein in accordance with the number of pixels in the pixel block in which a result of the determination satisfies a predetermined condition, a condition after the transition to the second state being performed is set.

39. A photodetection system comprising:
the photoelectric conversion device according to claim 23; and
a signal processing device configured to process a signal output from the photoelectric conversion device.

40. The photodetection system according to claim 39, wherein the signal processing device generates a distance image representing distance information to an object based on the signal.

41. A movable body comprising:
the photoelectric conversion device according to claim 23;
a distance information acquisition unit configured to acquire distance information to an object from a parallax image based on a signal output from the photoelectric conversion device; and
a control unit configured to control the movable body based on the distance information.

42. A photoelectric conversion device comprising a plurality of pixels, the plurality of pixels including:
an avalanche photodiode;
a signal processing circuit including a counter configured to generate a count value based on a photon incident on the avalanche photodiode during a count period, the signal processing circuit being configured to output the count value at a predetermined frame rate;
a quenching transistor configured to return a state of the avalanche photodiode after an avalanche multiplication has occurred to a state in which the avalanche multiplication is enabled again; and
a pulse generation unit configured to output a pulse signal whose level changes at a predetermined frequency to a gate of the quenching transistor,
wherein at least one pixel of the plurality of pixels transitions from a first state to a second state in which the frequency is higher than that in the first state and the number of bits of the count value is greater than that in the first state in accordance with a result of determination based on the count value and a predetermined threshold value, and
wherein in accordance with a result of the determination in one pixel of the plurality of pixels, at least two pixels of the plurality of pixels transition to the second state.

* * * * *